United States Patent
Liang et al.

(10) Patent No.: US 12,307,228 B2
(45) Date of Patent: May 20, 2025

(54) SOFTWARE CODE CHANGE METHOD AND APPARATUS

(71) Applicant: Huawei Cloud Computing Technologies Co., Ltd., Guizhou (CN)

(72) Inventors: Guangtai Liang, Beijing (CN); Tianyong Wu, Shenzhen (CN); Xiao Cheng, Shanghai (CN); Zeyu Wang, Beijing (CN); Zhao Wei, Gui'an (CN)

(73) Assignee: Huawei Cloud Computing Technologies Co., Ltd., Gui'an (CN)

( * ) Notice: Subject to any disclaimer, the term of this patent is extended or adjusted under 35 U.S.C. 154(b) by 0 days.

(21) Appl. No.: 17/678,625

(22) Filed: Feb. 23, 2022

(65) Prior Publication Data

US 2022/0179642 A1     Jun. 9, 2022

Related U.S. Application Data

(63) Continuation of application No. PCT/CN2020/111326, filed on Aug. 26, 2020.

(30) Foreign Application Priority Data

Aug. 26, 2019   (CN) .......................... 201910792544.9
Sep. 17, 2019   (CN) .......................... 201910877510.X

(51) Int. Cl.
   *G06F 8/65*           (2018.01)
(52) U.S. Cl.
   CPC .................................... *G06F 8/65* (2013.01)
(58) Field of Classification Search
   CPC ........................................................ G06F 8/65
   See application file for complete search history.

(56) References Cited

U.S. PATENT DOCUMENTS 6,564,374 B1 *  5/2003  Jaaskelainen, Jr. ... G06F 8/4441
                                                                717/154
6,792,595 B1 *  9/2004  Storistenau ............... G06F 8/33
                                                                717/109

(Continued)

FOREIGN PATENT DOCUMENTS

CN          102279873 A       12/2011
CN          105159715 A       12/2015

(Continued)

OTHER PUBLICATIONS

Tao Binxian,"Coderebuilder: the Research and Implementation of an Automated Java Concurrent Program Refactoring Tool",Nanjing University of Aeronautics and Astronautics, Jan. 2014, with an English abstract, total 59 pages.

(Continued)

*Primary Examiner* — Jae U Jeon

(57) ABSTRACT

In a software code change method, an apparatus determines to-be-changed software code and change configuration information according to an instruction of a user. The apparatus selects, from stored changers based on the change configuration information, a plurality of changers to be called to implement changes to the software code, and determines a calling sequence of the plurality of changers and sets attributes of each changer. The apparatus then sequentially calls the plurality of changers according to the calling sequence and based on the attributes of each changer to make changes to the software code.

18 Claims, 15 Drawing Sheets

(56) References Cited

U.S. PATENT DOCUMENTS

| | | | |
|---|---|---|---|
| 9,727,623 B1* | 8/2017 | Catania | G06F 16/2379 |
| 10,223,076 B1 | 3/2019 | Owen et al. | |
| 2003/0101437 A1* | 5/2003 | Gritter | G06F 11/362 |
| | | | 714/E11.21 |
| 2003/0131342 A1* | 7/2003 | Bates | G06F 11/3664 |
| | | | 717/110 |
| 2007/0300215 A1* | 12/2007 | Bardsley | G06F 11/3409 |
| | | | 717/168 |
| 2010/0050151 A1* | 2/2010 | Balasubramanian | G06F 8/33 |
| | | | 717/105 |
| 2011/0239201 A1* | 9/2011 | Vaidya | G06F 8/456 |
| | | | 717/149 |
| 2011/0246993 A1* | 10/2011 | Moir | G06F 9/467 |
| | | | 711/147 |
| 2012/0084756 A1* | 4/2012 | Subramanian | G06F 11/3676 |
| | | | 717/124 |
| 2013/0047138 A1* | 2/2013 | Radez | G06F 8/61 |
| | | | 717/121 |
| 2014/0215446 A1 | 7/2014 | Araya et al. | |
| 2017/0161061 A1 | 6/2017 | Eberlein et al. | |
| 2020/0097389 A1* | 3/2020 | Smith | G06F 11/0793 |
| 2020/0201608 A1* | 6/2020 | Wallbaum | G06F 8/35 |

FOREIGN PATENT DOCUMENTS

| | | |
|---|---|---|
| CN | 106033391 A | 10/2016 |
| CN | 106648618 A | 5/2017 |
| CN | 106648636 A | 5/2017 |
| CN | 109117164 A | 1/2019 |
| CN | 109828808 A | 5/2019 |
| CN | 109933326 A | 6/2019 |
| CN | 110780897 A | 2/2020 |

OTHER PUBLICATIONS

Hoan Anh Nguyen et al.,"A Graph-based Approach to API Usage Adaptation",OOPSLA/SPLASH 10, Oct. 17-21, 2010, total 20 pages.

Ling Wu et al.,"Transforming Code with Compositional Mappings for API-Library Switching",2015 IEEE 39th Annual International Computers, Software and Applications Conference, total 10 pages.

Sichen Meng et al.,"A History-Based Matching Approach to Identification of Framework Evolution",2012 IEEE, total 11 pages.

Kingsum Chow et al., Semi-automatic update of applications in response to library changes, 1996 IEEE, total 10 pages.

Chenglong Wang et al.,"Transforming Programs between APIs with Many-to-Many Mappings",30th European Conference on Object-Oriented Programming (ECOOP 2016), total 26 pages.

Caitlin Sadowski et al.,"Tricorder: Building a Program Analysis Ecosystem",2015 IEEE/ACM 37th IEEE International Conference on Software Engineering, total 11 pages.

Marius Nita et al.,"Using Twinning to Adapt Programs to Alternative APIs",ICSE 10, May 2-8, 2010, total 10 pages.

Sukhee Lee et al., Automated scheduling for clone-based refactoring using a competent GA, Software practice and Experience, Dec. 29, 2010, 30 pages.

H Liu et al., Conflict-aware schedule of software refactorings, IET Software, Apr. 24, 2008, 15 pages.

Minhaz Fahim Zibran et al., Conflict-aware optimal scheduling of prioritised code clone refactoring, IET Software, Apr. 9, 2013, 20 pages.

Miguel P. Monteiro et al., An illustrative example of refactoring object-oriented source code with aspect-oriented mechanisms, Software practice and Experience, Aug. 21, 2007, 36 pages.

* cited by examiner

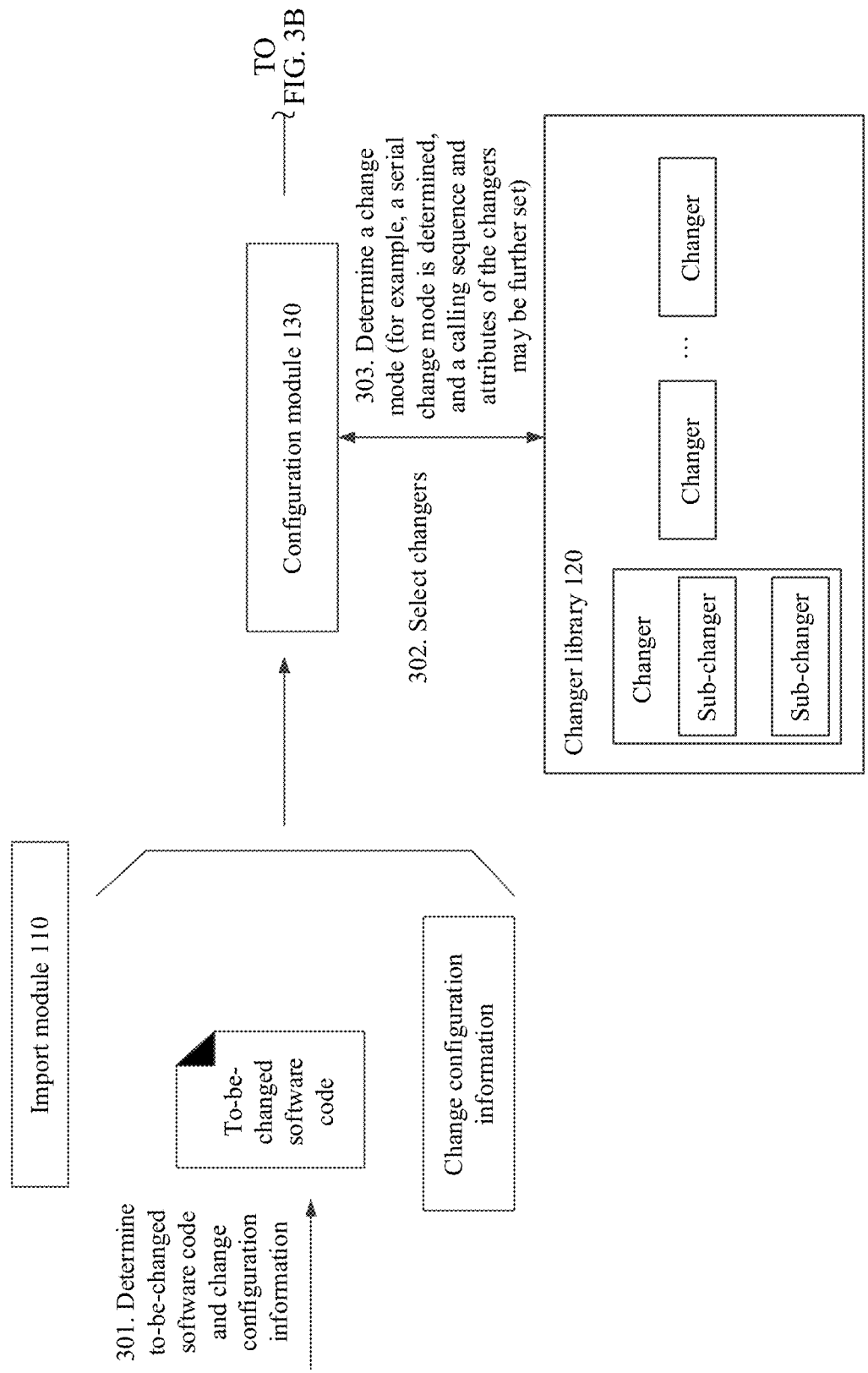

SOFTWARE CODE CHANGE METHOD AND APPARATUS

CROSS-REFERENCE TO RELATED APPLICATIONS

This application is a continuation of International Application No. PCT/CN2020/111326, filed on Aug. 26, 2020, which claims priority to Chinese Patent Application No. 201910877510.X, filed on Sep. 17, 2019 and Chinese Patent Application No. 201910792544.9, filed on Aug. 26, 2019. The aforementioned patent applications are hereby incorporated by reference in their entirety.

TECHNICAL FIELD

This application relates to the field of computer technologies, and in particular, to a software code change method and apparatus.

BACKGROUND

During software development and maintenance, software code needs to be changed in many scenarios, for example, software code update after library upgrade or software code format change. In each scenario, changes on software code have a plurality of different change types. For example, in a library upgrade scenario, a formal parameter of a library function is changed, and in this case, actual parameters in all references of the library function in software code need to be changed. Alternatively, a name of a library function is changed, and in this case, the name of the library function in software code needs to be changed to a changed name of the library function. For another example, in a software code format change scenario, an indentation manner, an alignment manner, or the like of software code may need to be changed.

Current software code change processes only support monotonous changes. That means that when software code is changed, changes of only one change type can be performed. Currently, a change manner in which a plurality of change types can be performed simultaneously on software code is not available.

SUMMARY

This application provides a code change method, to provide an efficient change manner in which a plurality of change types can be performed simultaneously on software code.

According to a first aspect, this application provides a code change method. The method may be performed by a change apparatus. The change apparatus may obtain software code and change configuration information of the software code that are input by a user. The change configuration information includes multiple to-be-changed code elements, multiple change manners of the multiple to-be-changed code elements, and multiple changed code elements corresponding to the multiple to-be-changed code elements. The change apparatus may select, from stored changers based on the change configuration information, a plurality of changers that need to be called, and determine a calling sequence of the plurality of changers. The change apparatus may sequentially call the plurality of changers based on the calling sequence, to change the software code. Each changer can change a type of to-be-changed code elements in the software code, an input of the first called changer of the plurality of changers is the software code, and changed software code of the first called changer is input into another changer of the plurality of changers.

According to the foregoing method, the change apparatus can flexibly call a plurality of different changers based on a requirement of the user, and can simultaneously perform a plurality of different types of changes on the software code.

In a possible implementation, the change apparatus first determines whether there are conflicting changers in the plurality of selected changers. The conflicting changers mean that if one of the changers performs a change first, a subsequent changer cannot perform a normal change when changing software code output by the changer. If there are no conflicting changers, the change apparatus may use a parallel change mode, to simultaneously call the plurality of changers to change the software code, and then merge change content of all the changers.

If there are conflicting changers, the change apparatus determines that the plurality of changers change the software code in a serial change mode or a partial serial or partial parallel change mode.

According to the foregoing method, the change apparatus may flexibly select different change modes to change the software code, so that a selected change mode is more applicable to the software code, and a change manner is more efficient.

In a possible implementation, if at least one of the plurality of changers includes direct change content and delayed change content, when the change apparatus sequentially calls the plurality of changers based on the calling sequence of the plurality of changers to change the software code, when the at least one changer is called, the direct change content may be applied to software code input into the at least one changer, and the delayed change content may be applied after calling of the last changer of the plurality of changers ends.

In a possible implementation, after the calling sequence is determined, attributes may be further set for each changer, and the attributes of the changer are used to describe whether the changer retains or deletes changes on some lines in the software code.

According to the foregoing method, when calling each changer, the change apparatus distinguishes direct change content from delayed change content that may have change conflict in change content of each changer, and applies all delayed change content generated by a plurality of changers to the software code at the end, so that conflict caused by changes directly performed by different changers in a calling process can be effectively avoided.

In a possible implementation, before sequentially calling the plurality of changers, the change apparatus may first determine attributes of each changer based on the calling sequence of the plurality of changers. The attribute of each changer is used to describe processing performed by each changer on a change on a target line in the software code. Certainly, the change apparatus may not determine the attributes of each changer.

According to the foregoing method, the change apparatus can set attributes for a changer, so that when the changer is subsequently called, it can be relatively accurately determined whether to retain or delete changes on some target lines in the software code.

In a possible implementation, the change configuration information further includes attributes of each changer, and the attribute of each changer is used to describe processing performed by each changer on a change on a target line in the software code.

According to the foregoing method, the user may autonomously configure the attributes of the changer, which gives the user more initiative, and helps improve flexibility of software code change.

In a possible implementation, when determining the direct change content of the at least one changer, the change apparatus may directly determine the direct change content of the at least one changer based on a change operation of the at least one changer, or may determine the direct change content of the at least one changer based on attributes of the at least one changer.

According to the foregoing method, the change apparatus can relatively accurately determine, based on the attributes set for the changer, whether to retain or delete changes on some target lines in the software code, to determine the direct change content of the changer.

In a possible design, when determining the direct change content of the at least one changer based on the attributes of the at least one changer, the change apparatus needs to determine a first attribute of the at least one changer, for example, a merge change attribute and an overwrite change attribute. The first attribute describes retention or deletion of a change performed by the at least one changer on a first target line of the software code, and the first target line is one or more same lines on which the at least one changer and a changer called prior to the at least one changer change the software code. A change that needs to be retained by the at least one changer is determined based on the first attribute of the at least one changer, to determine the direct change content of the at least one changer.

According to the foregoing method, the change apparatus may relatively conveniently determine, based on the attributes of the changer, a change that needs to be deleted or retained, to determine the direct change content that is finally actually executed.

In a possible design, when determining the direct change content of the at least one changer based on the attributes of the at least one changer, the change apparatus may determine the direct change content of the at least one changer based only on the first attribute of the at least one changer, or may determine the direct change content of the at least one changer with reference to the first attribute and a second attribute of the at least one changer, or may determine the direct change content of the at least one changer based only on the second attribute of the at least one changer. The second attribute (for example, an ignore change attribute) of the at least one changer describes retention or deletion of the at least one changer on a change on a second target line of the software code, and the second target line is one or more lines on which the at least one changer changes the software code and that are different from those of the changer called prior to the at least one changer.

According to the foregoing method, the change apparatus may relatively conveniently determine, based on the attributes of the changer, a change that needs to be deleted or retained, to determine the direct change content that is finally actually executed.

In a possible design, when determining that delayed change content exists when the changer changes the software code input into the changer, the change apparatus may preset one or more types of delayed change content, and determine, based on the preset delayed change content, the delayed change content from change content when the changer changes the software code input into the changer.

According to the foregoing method, the change apparatus may determine the delayed change content based on the preset information, so that the delayed change content that needs to be retained and whose change is performed at the end can be relatively quickly determined.

In a possible design, when the change apparatus calls the first changer, the first called changer may analyze the software code to generate an analysis result. The analysis result may include positions of all code elements existing in the software code. The change apparatus may store the analysis result, so that when another changer is subsequently called, the another changer may call the analysis result to change software code input into the another changer.

According to the foregoing method, the software code analysis operation needs to be performed only once, and the subsequent changer only needs to call the analysis result generated by the previous changer, without repeated analysis, which can effectively save time and improve efficiency of software code change.

In a possible design, after changing the software code, the change apparatus may further display final changed software code, and display change positions and change content of changes performed on the software code by the plurality of changers.

According to the foregoing method, the change apparatus can relatively intuitively display the changed software code, and can further display the changes, to facilitate viewing by the user.

According to a second aspect, an embodiment of this application further provides a change apparatus. For beneficial effects, refer to the description of the first aspect. Details are not described herein again. The apparatus has a function of implementing behavior in the method example in the first aspect. The function may be implemented by hardware, or may be implemented by hardware executing corresponding software. The hardware or the software includes one or more modules corresponding to the foregoing function. In a possible design, a structure of the apparatus includes an import module, a configuration module, a changer library, and a change module. These modules may perform corresponding functions in the method example in the first aspect. For details, refer to detailed descriptions in the method example. Details are not described herein again.

According to a third aspect, an embodiment of this application further provides a computing device. The computing device includes a processor and a memory, and may further include a communications interface. Optionally, the computing device further includes a display. The processor executes program instructions in the memory to perform the method according to any one of the first aspect or the possible implementations of the first aspect. The memory is coupled to the processor, and stores program instructions and data that are necessary in a process of determining traffic flows. The communications interface is configured to communicate with another device, for example, receive software code and change configuration information. The display is configured to display information to a user when triggered by the processor.

According to a fourth aspect, this application provides a computing device cluster. The computing device cluster includes at least one computing device. Each computing device includes a memory and a processor. The processor in the at least one computing device is configured to access code in the memory to perform the method according to any one of the first aspect or the possible implementations of the first aspect.

According to a fifth aspect, this application provides a non-transient readable storage medium. When the non-transient readable storage medium is executed by a computing device, the computing device performs the method according to any one of the first aspect or the possible implementations of the first aspect. The storage medium stores a program. The storage medium includes but is not limited to a volatile memory, for example, a random access memory, or a non-volatile memory, such as a flash memory, a hard disk drive (HDD), and a solid-state drive (SSD).

According to a sixth aspect, this application provides a computer program product. The computer program product includes computer instructions. When the computer instructions are executed by a computing device, the computing device performs the method according to any one of the first aspect or the possible implementations of the first aspect. The computer program product may be a software installation package. When the method according to any one of the first aspect or the possible implementations of the first aspect needs to be used, the computer program product may be downloaded to and executed on the computing device.

According to a seventh aspect, this application further provides a computer chip. The chip is connected to a memory, and the chip is configured to read and execute a software program stored in the memory, to perform the method according to any one of the first aspect or the possible implementations of the first aspect.

BRIEF DESCRIPTION OF DRAWINGS

FIG. 3A and FIG. 3B are a diagram of a software code change method that supports a plurality of types of changes according to this application;

DESCRIPTION OF EMBODIMENTS

Before a software code change method that supports a plurality of types of changes and that is provided in embodiments of this application is described, concepts related to the embodiments of this application are first described.

(1) Software Code, Executable Code, Library, and build System

The software code is written by a programmer by using a language supported by a development tool. The software code includes a collection of digits or letters that have a pointing meaning. The software code includes a plurality of lines of code, a line number is set for each line, and the line of code is identified by the line number.

The software code cannot be directly executed on a computer, and requires a build system to call a compiler based on configuration information recorded in a build file to convert the software code into binary code that can be recognized by a machine. The binary code is also referred to as executable code.

The library is a set of code callable when software code is written. The library includes a plurality of pieces of fixedly configured code, and the code in the library may be directly called when a software program is written. The library may be provided by a third party, and embedded in the software code by reference (calling), to improve code reuse and development efficiency.

The build system is a tool configured to generate, based on software code, an executable program that can be recognized by a machine. To build a target, the build system needs to know some configuration information, such as a position of a toolchain component, a position of the software code, library dependencies, a position of a library, and a version of the library. The configuration information is usually recorded in a build file that the build system can read.

(2) Class, Inner Class, Package, Function/Method, and Field/Variable

A writing specification, such as object-oriented programming (OOP) or procedure-oriented programming (POP), needs to be met in a process of writing software code. Programming languages of the object-oriented programming include C++, Java, C#, and the like. Programming languages of the procedure-oriented programming include Fortran, C, and the like.

Figure 1A:
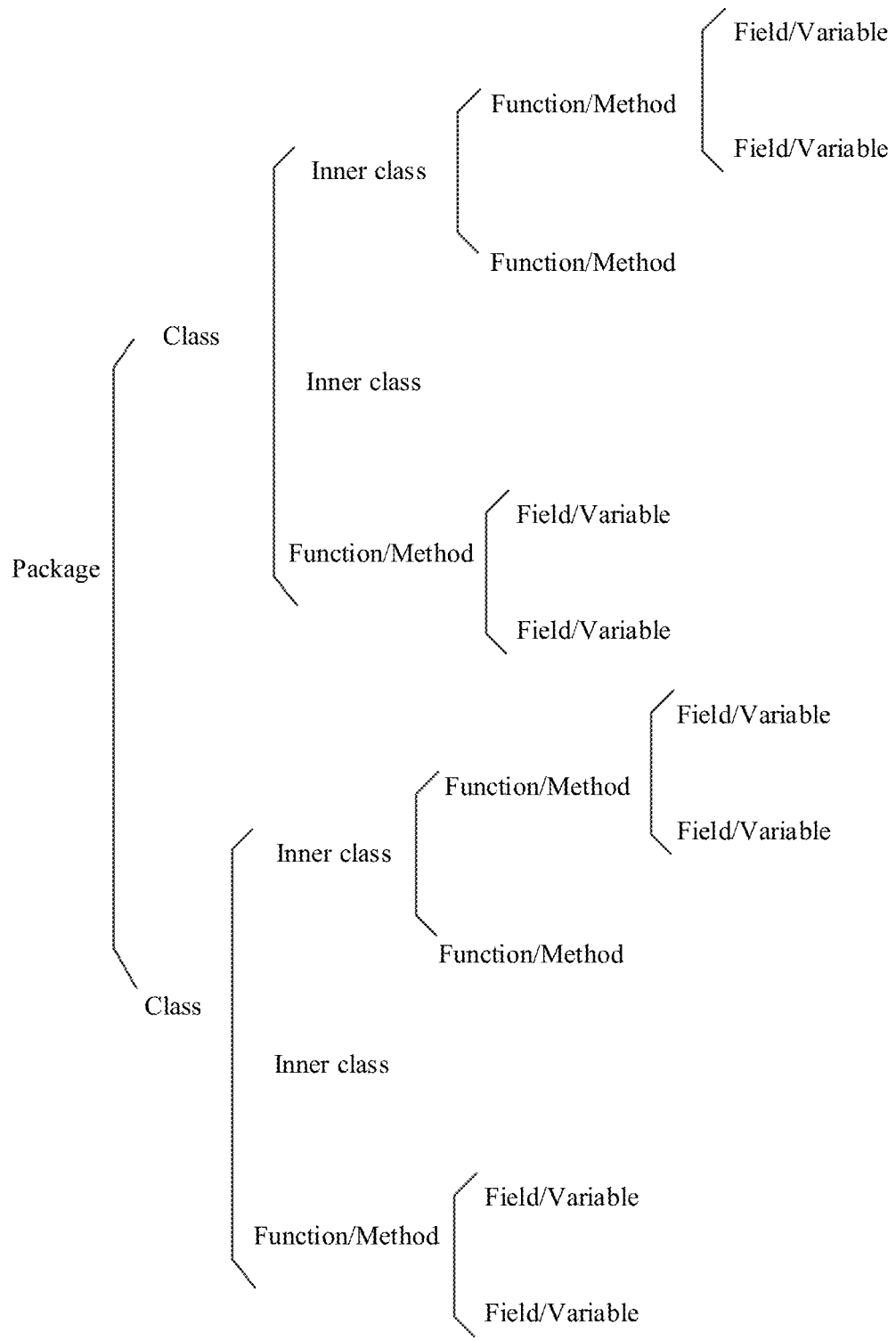
FIG. 1A is a diagram of a relationship between code elements according to this application.

Software code written by using a writing specification may include code elements such as a class, a package, a function/method, and a field/variable. For a relationship between different types of code elements, refer to FIG. 1A. A package may include one or more classes. Each class may include an inner class and a function/method. A field/variable may be called in the function/method. The inner class is similar to the class, and the inner class may also include a function/method.

The class is a construction of an object-oriented computer programming language in the object-oriented programming, and describes a common method and field of created objects.

The function/method is a sub-program in the class. A method usually includes a series of statements and can perform a function. It is referred to as a method in the writing specification of object-oriented programming, and referred to as a function in the writing specification of procedure-oriented programming.

The field/variable stores some data, such as an integer and a character, a string, a hash table, and a pointer.

The package is used to describe a path structure of a program. A package usually includes a plurality of classes.

When a class is referenced, a complete package path needs to be filled in a package import area.

The inner class is a class included in a class.

(3) Parallel Change Mode, Serial Change Mode, and Partial Serial or Partial Parallel Mode The parallel change mode means that a plurality of changers simultaneously change to-be-changed software code, and then changed software code generated by all the changers by changing the to-be-changed software code is merged, to generate final changed software code.

The serial change mode means that a plurality of changers sequentially change to-be-changed software code, an input of each changer is an output of a previous changer, and an input of the first called changer is the to-be-changed software code.

The partial serial or partial parallel mode is a combination of the parallel change mode and the serial change mode, where a plurality of changers include changers that require serial calling and changers that require parallel calling. The partial serial or partial parallel mode may be classified into a serial-parallel mode dominated by the parallel mode and a serial-parallel mode dominated by the serial mode.

Figure 1B:
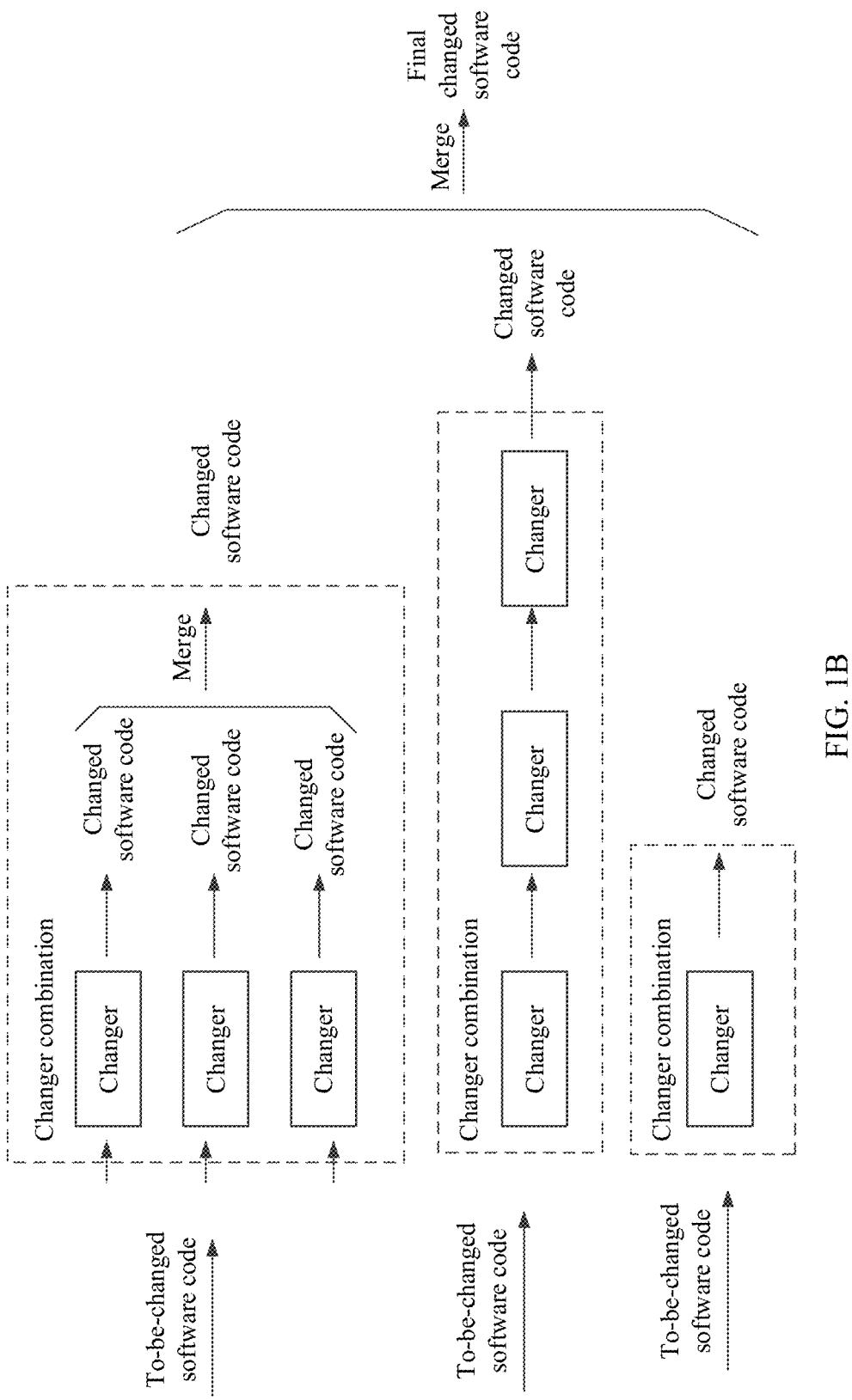
FIG. 1B is a diagram of a partial serial or partial parallel mode according to this application.

As shown in FIG. 1B, in the serial-parallel mode dominated by the parallel mode, there may be a plurality of changer combinations, and each changer combination includes one or more changers. The plurality of changer combinations simultaneously change to-be-changed software code, and then changed software code generated by all the changer combination by changing the to-be-changed software code is merged. A plurality of changers in the plurality of changer combinations may use the parallel change mode or the serial change mode.

Figure 1C:
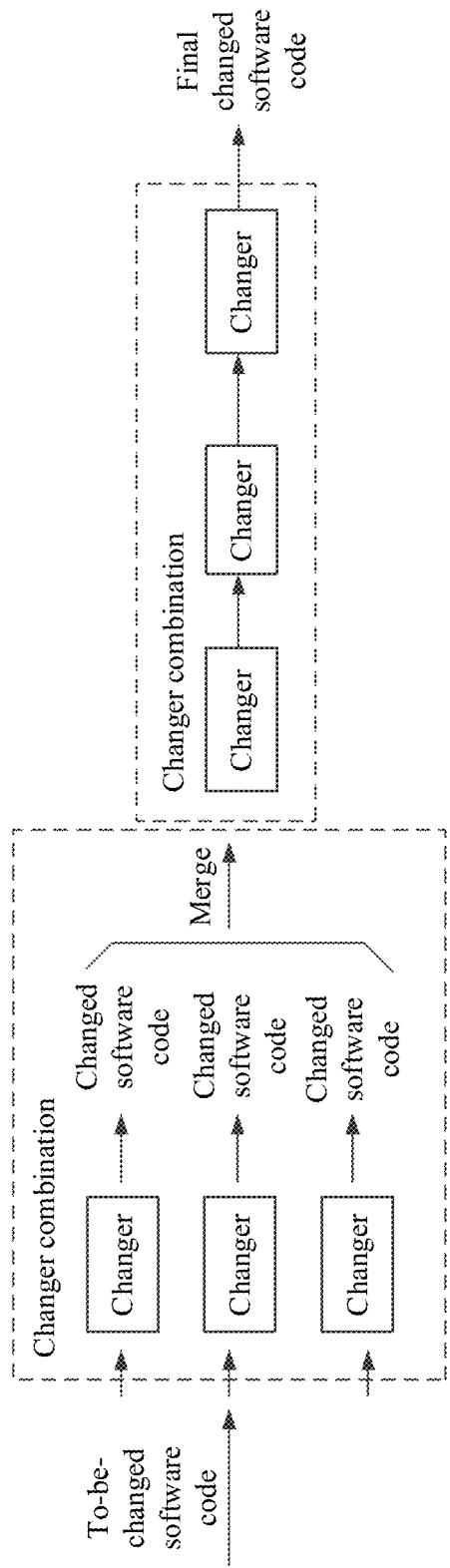
FIG. 1C is a diagram of another partial serial or partial parallel mode according to this application.

As shown in FIG. 1C, in the serial-parallel mode dominated by the serial mode, there may be a plurality of changer combinations, and each changer combination includes one or more changers. The plurality of changer combinations sequentially change to-be-changed software code, an input of each changer combination is an output of a previous changer combination, and an input of the first called changer combination is the to-be-changed software code. A plurality of changers in the plurality of changer combinations may use the parallel change mode or the serial change mode.

It should be noted that, the foregoing two partial serial or partial parallel modes are merely examples, and any change mode in which there are a plurality of changers serially called and a plurality of changers parallel called belongs to the partial serial or partial parallel mode.

(4) Changer and Sub-Changer

Each changer is configured to perform a type of changes on to-be-changed software code, and may change a type of code elements (such as a class, a method, or a field) in the to-be-changed software code. Different changers change different code elements.

The following lists some common changers in a library upgrade scenario of a Java program.

a. Class name changer. In the library upgrade scenario, when a class name of a class needs to be changed, the changer may change the class name of the class in software code to a class name of another class.

b. Method name changer. In the library upgrade scenario, when a method name of a method in a class needs to be changed, the changer may change the method name of the method in the class in software code to a method name of another method in the class.

c. Field name changer. In the library upgrade scenario, when a name of a field in a class needs to be changed, the changer may change the name of the field in the class in software code to a name of another field in the class.

d. Library version changer. In the library upgrade scenario, when a version of a library needs to be changed, the changer may change the version of the library in a build file in software code to another version of the library.

e. Package name changer. In the library upgrade scenario, when a package name of a package needs to be changed, the changer may change all referenced package names in software code to a package name of another package.

f. Package delete changer. In the library upgrade scenario, when a package needs to be deleted, the changer finds all reference positions of the package in software code, and outputs all the reference positions of the package.

g. Class delete changer. In the library upgrade scenario, when a class needs to be deleted, the changer finds all reference positions of the class in software code, and outputs all the reference positions of the class.

k. Field delete changer. In the library upgrade scenario, when a field needs to be deleted, the changer finds all reference positions of the field in the software code, and outputs all reference positions of the field.

l. Method delete changer. In the library upgrade scenario, when a method needs to be deleted, the changer finds all reference positions of the method in software code, and prompts a user.

In the changers, three name changers (the class name changer, the method name changer, and the field name changer) include two sub-changers, and each sub-changer is configured to change an area (such as a reference area and a package import area) of software code. The class name changer is used as an example. The class name changer may be divided into a class reference sub-changer and a package import sub-changer.

Class reference sub-changer: In the library upgrade scenario, when a class name of a class needs to be changed, the sub-changer may change all referenced class names of the class in software code (or in other words, class names of the class in a reference area) to a name of another class.

Package import sub-changer: In the library upgrade scenario, when a class name of a class needs to be changed, the sub-changer may change the class name of the class in a package import area in software code to a class name of another class.

The changer or the sub-changer may be understood as a software apparatus, and the software apparatus includes an input and an output. The input is software code that needs to be changed, and the output is changed software code.

(5) Change Content, Direct Change Content, and Delayed Change Content of the Changer When each changer changes software code, the changer usually changes some fields or some formats in the software code. When the changer changes the software code, a part that needs to be changed is referred to as change content of the changer.

When a plurality of changers change to-be-changed code in the serial change mode, the change content of the changer may include direct change content and delayed change content. Alternatively, the change content of the changer may include only the direct change content or the delayed change content.

The direct change content refers to a part where the software code can be directly changed, and the change of the part does not affect a change of a subsequent changer.

Conversely, the delayed change content refers to a part where a change of a subsequent changer is affected if the software code is directly changed. In other words, if the part of content is changed, when the subsequent changer performs a change based on changed software code of the current changer, the subsequent changer cannot perform a normal change operation. A type of the delayed change content may be preset. When a changer is called to change software code, it may be determined, based on the preset type of the delayed change content and a change type performed by the changer, whether change content of the changer includes delayed change content.

The following lists two types of delayed change content in the class name changer in the library upgrade scenario, which are inner class change content and class split change content, respectively.

1. Inner Class Change Content.

It is assumed that a first class in to-be-changed software code needs to be changed to a second class, and one or more inner classes in the first class need to be changed to another class. The another class is a class other than the first class. In this case, change content generated when the changer changes the first class of a package import area to the second class and change content generated when the changer changes the one or more inner classes in the first class of the package import area to the another class may both be used as inner class change content of the changer.

For example, there are a plurality of inner classes in a class A, which are an inner class B, an inner class C, and an inner class D, respectively, the class A needs to be changed to a class ZZ, and one or more of the inner class B, the inner class C, and the inner class D need to be changed to another class. For example, the inner class B needs to be changed to the class ZZ, the inner class C needs to be changed to a class F, and the inner class D needs to be changed to a class Q.

For example, a changer 1 is configured to change the class A to the class ZZ, a changer 2 is configured to change the inner class B to the class ZZ, a changer 3 is configured to change the inner class C to the class F, and a changer 4 is configured to change the inner class D to the class Q.

If any one of the changers 1, 2, 3, and 4 changes an inner class or the class A in all package import statements in to-be-changed software code, during subsequent change, another changer cannot detect information about an inner class that needs to be changed. For example, the changer 1 first changes the class A in all the import statements in the to-be-changed software code to the class ZZ. Subsequently, when the changer 2, the changer 3, and the changer 4 further change changed software code of the changer 1, because the class A cannot be found in a package import area of the changed software code of the changer 1, the inner classes in the class A cannot be obtained by query, and cannot be changed.

Therefore, change content of the changer 1, the changer 2, the changer 3, and the changer 4 for the package import area are all inner class change content.

2. Class Split Change Content.

It is assumed that a first class in to-be-changed software code needs to be changed to a second class, and a function, a method, or a field in the first class needs to be migrated to another class. In this case, change content generated by changing the first class of a package import area to the second class, and change content generated by changing the function, the method, or the field in the first class of the package import area to the another class may both be used as class split change content.

For example, a class A includes a field E and a method F, the class A needs to be changed to a class X, and the field E and the method F need to be changed to another class. For example, the field E needs to be changed to a class Y, and the method F needs to be changed to a class Z.

For example, a changer 5 is configured to change the class A to the class X, a changer 6 is configured to change the field E to the class Y, and a changer 7 is configured to change the method F to the class X.

If any one of the changers 5, 6, and 7 changes the field E, the method F, or the class A in all package import statements in to-be-changed software code, during subsequent change, another changer cannot detect information about the class that needs to be changed. For example, the changer 5 first changes the class A in all the import statements in the to-be-changed software code to the class X. Subsequently, when the changer 6 and the changer 7 further change changed software code of the changer 1, because the class A cannot be found in the package import area of the changed software code of the changer 5, the field E and the method F in the class A cannot be obtained by query, and cannot be changed.

Therefore, change content of the changer 5, the changer 6, and the changer 7 for the package import area are all class split change content.

(6) Two Conflicting Changers

The two conflicting changers mean that when the two changers change a same piece of software code, change content of one changer affects a change of the other.

In the embodiments of this application, a change apparatus may preconfigure a changer set. The changer set includes one or more changers, and any two changers in the changer set do not conflict. When the change apparatus calls changers in the changer set to change to-be-changed software code, the changers in the changer set may be called in the parallel change mode to change the to-be-changed software code.

A configuration manner of the changer set is not limited in the embodiments of this application. The changer set may be manually configured, or changers that can be parallel called may be placed in the changer set after simulation.

(7) Original Change Instance Set, Intermediate Change Instance Set, and Target Change Instance Set An original change instance set of a changer includes one or more change instances, and each original change instance in the original change instance set records a line that needs to be changed in software code input into the changer (that is, software code output by a previous changer of the changer), and changed content of the line.

An intermediate change instance set of the changer includes one or more change instances, and each change instance in the intermediate change instance set records a line that needs to be changed by the changer in to-be-changed software code, and changed content of the line.

A difference between the original change instance set and the intermediate change instance set lies in being based on different software code. The original change instance set is based on the software code input into the changer. The intermediate change instance set is based on the to-be-changed software code, which is to-be-changed software code initially determined by the change apparatus.

When a plurality of changers are called in the serial change mode to change to-be-changed software code, an original change instance set and an intermediate change instance set of the first called changer are the same, an original change instance set of the second called changer is based on software code output by the first called changer, and an intermediate change instance set of the second called changer is based on the to-be-changed software code.

A change instance in the intermediate change instance set of the changer corresponds to a change instance in the original change instance set of the changer, and the change instance in the intermediate change instance set of the changer is generated based on the corresponding change instance in the original change instance set of the changer, and is determined based on an intermediate change instance set of a changer called prior to the changer. For a determining manner, refer to descriptions in the following embodiments.

A target change instance set of the changer is generated after conflict between changers is eliminated. The target change instance includes one or more change instances, and each change instance in the target change instance set records a line that needs to be changed in the software code input into the changer (that is, the software code output by the previous changer of the changer), and changed content of the line.

Change instances included in the original change instance set and the target change instance set may be the same, or the target change instance set may include only some change instances in the original change instance set. The change instance in the target change instance set of the changer records direct change content generated by a change actually performed when the changer changes the input software code. The change instance in the original change instance set of the changer records change content generated by a change expected to be performed when the changer changes the input software code. Because some change instances are deleted in a process of eliminating the conflict between the changers, the target change instance set includes only some change instances in the original change instance set.

In the embodiments of this application, the change apparatus needs to maintain an intermediate change instance set for each changer. Based on the intermediate change instance set of the changer, the change apparatus can eliminate conflict between changers by using attributes of the changers, and determine a change instance that needs to be deleted from the intermediate change instance set of the changer. The change apparatus may summarize intermediate change instance sets that are of changers needing to be called and that are obtained after conflict between the changers is eliminated (if a change instance that needs to be deleted exists, after the conflict between the changers is eliminated, intermediate change instance sets of the changers are intermediate change instance sets in which the change instance has been deleted). Summarized intermediate change instance sets (which may be briefly referred to as a total change instance set for ease of description) are stored, and displayed to a user on a display.

In other words, the total change instance set includes a plurality of change instances, which is based on the to-be-changed software code, and records change content generated by changes actually performed on the to-be-changed software code when the change apparatus calls the plurality of changers in the serial change mode.

Certainly, when the change apparatus eliminates the conflict between the changers by using the attributes of the changers, and deletes one or more change instances from the intermediate change instance sets of the changers, the change apparatus may also delete one or more corresponding change instances from original change instance sets of the changers, to generate target change instance sets of the changers.

Because there are many software code change scenarios, a library upgrade scenario is used as an example for description in this application. The following lists two change types in the library upgrade scenario.

Change type 1: When a formal parameter of a library function is changed, actual parameters in all references to the library function in software code need to be changed. For this type of changes, all actual parameters called by the library function in to-be-changed software code need to be changed.

Change type 2: When a name of a library function is changed, the name of the library function in software code needs to be changed to a name of another library function. For this type of changes, all names of the library function that are present in to-be-changed software code need to be changed to a name of another library function.

Currently, when software code is changed, changes of one change type are performed at a time. If changes of a plurality of change types need to be performed, changes of different change types can only be performed on the software code separately. As a result, a change manner of the software code is relatively inflexible.

Therefore, the embodiments of this application provide a software code change method that supports a plurality of types of changes. In the embodiments of this application, a change apparatus may select changers, determines a calling sequence of the changers, and set attributes of each changer based on change configuration information from a user on to-be-changed software code. Subsequently, the change apparatus sequentially calls the changers based on the determined calling sequence to perform changes. An input of the first called changer is the to-be-changed software code, and an input of any changer other than the first called changer is an output of a previous changer.

In the manner of the embodiments of this application, the change apparatus can call a plurality of different changers based on the change configuration information of the user, to implement a plurality of different types of changes on the to-be-changed software code. A plurality of different changers can be flexibly organized to change the to-be-changed software code, which helps improve efficiency of software code change.

The software code change method that supports a plurality of types of changes and that is provided in the embodiments of this application is performed by a change apparatus. A deployment position of the change apparatus is not limited in the embodiments of this application. The change apparatus may be deployed in a cloud. For example, the change apparatus may be a cloud server. Alternatively, the change apparatus may be a virtual machine created in a cloud server. Alternatively, the change apparatus may be a software apparatus deployed on a cloud server or a virtual machine. The software apparatus is configured to perform a plurality of different types of changes on to-be-changed software code. The software apparatus may be deployed on a plurality of servers in a distributed manner, or deployed on a plurality of virtual machines in a distributed manner, or deployed on a virtual machine and a server in a distributed manner.

Figure 2A:
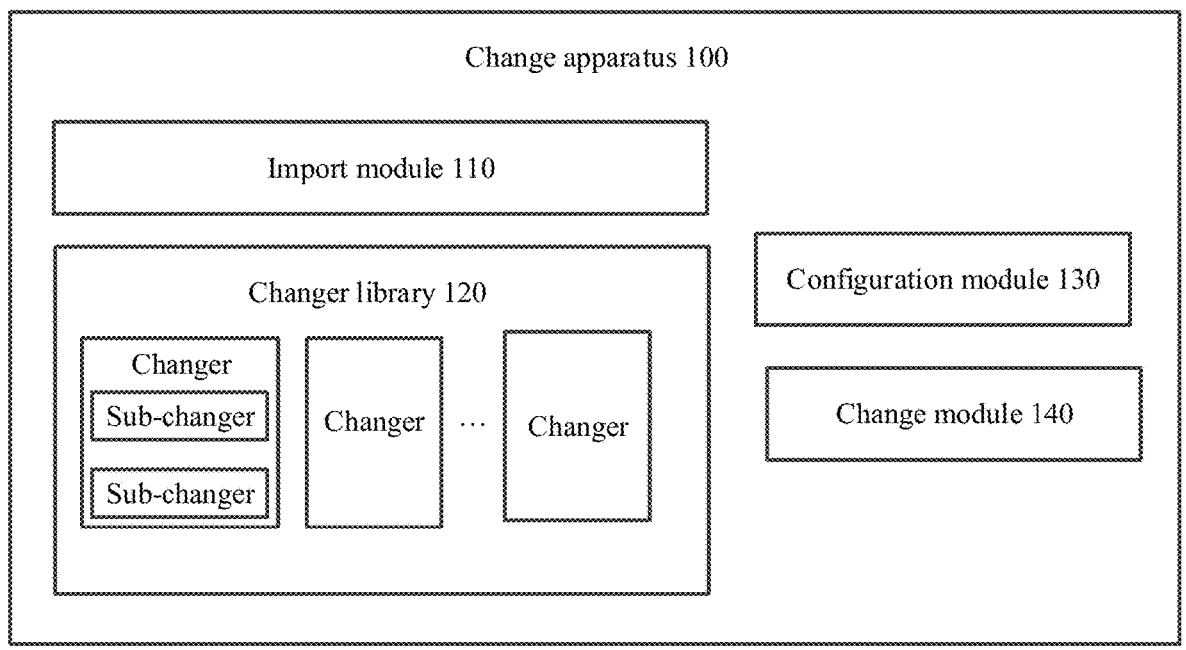
FIG. 2A is a diagram of a structure of a change apparatus according to this application.

FIG. 2A shows a change apparatus 100 according to an embodiment of this application. The change apparatus includes an import module 110, a changer library 120, a configuration module 130, and a change module 140.

The import module 110 is configured to determine to-be-changed software code and change configuration information from a user on the to-be-changed software code.

The changer library 120 stores a plurality of changers. Some changers (such as name changers) include one or more sub-changers, and each changer can change a type of code element.

The configuration module 130 may select changers from the changer library 120 based on the change configuration information, and configure a calling mode, for example, select a serial change mode or a parallel change mode, and may also configure attributes of each changer.

After the configuration module 130 selects the calling mode, the change module 140 may call, based on the calling mode selected by the configuration module 130, the changers selected by the configuration module 130, to change the to-be-changed software code.

In a process in which the change module 140 calls the changers selected by the configuration module 130 to change the to-be-changed software code, each changer may change software code input into the changer.

Each module included in the change apparatus 100 may be a software module.

Figure 2B:
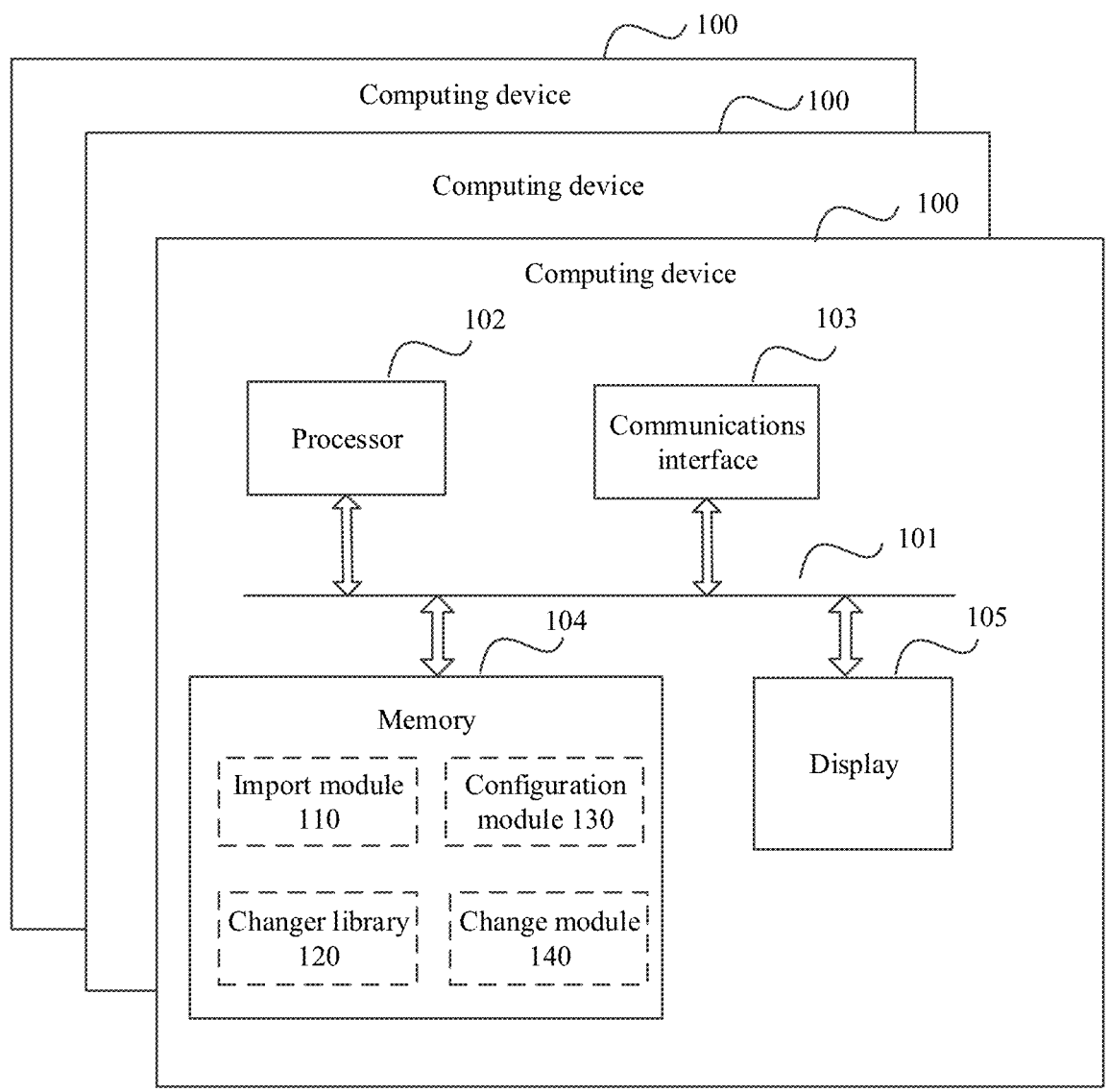
FIG. 2B is a diagram of a structure of a computing device cluster according to this application.

The following describes a system architecture to which an embodiment of this application is applicable. FIG. 2B shows a computer cluster according to an embodiment of this application. The computer cluster includes at least one computing device 100. A communication channel is established between computing devices 100 through a communications network.

Each computing device 100 includes a bus 101, a processor 102, a communications interface 103, and a memory 104. Optionally, the computing device 10 may further include a display 105. The processor 102, the memory 104, and the communications interface 103 communicate with each other through the bus 101.

The processor 102 may include one or more general-purpose processors, for example, a central processing unit (CPU), or a combination of a CPU and a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The memory 104 may include a volatile memory, for example, a random access memory (RAM). The memory 104 may further include a non-volatile memory (NVM), for example, a read-only memory (ROM), a flash memory, a hard disk drive (HDD), or a solid-state drive (SSD). The memory 104 may further include a combination of the foregoing types.

The memory 104 stores executable code. The processor 102 may read the executable code in the memory 104 to implement a function, and may further communicate with another computing device through the communications interface 103. The processor 102 may further trigger the display 105 to display information to a user, such as information included in interfaces shown in FIG. 4, FIG. 9, and FIG. 10 in the embodiments of this application.

In this embodiment of this application, the processor 102 may implement functions of one or more modules (for example, one or more of the import module 110, the changer library 120, the configuration module 130, and the change module 140) of the change apparatus 100. In this case, the memory 104 stores the one or more modules (for example, the one or more of the import module 110, the changer library 120, the configuration module 130, and the change module 140) of the change apparatus 100.

In this embodiment of this application, processors 102 in a plurality of computing devices 100 may work in coordination, to perform the software code change method that supports a plurality of types of changes and that is provided in the embodiments of this application.

It should be noted that, when the memory 104 stores the change module 140, the change module 140 further includes a cache space. The cache space is located in the memory 104, and the cache space may be configured to store an analysis result obtained by the first called changer by analyzing to-be-changed software code, and delayed change content of each called changer.

Figure 2C:
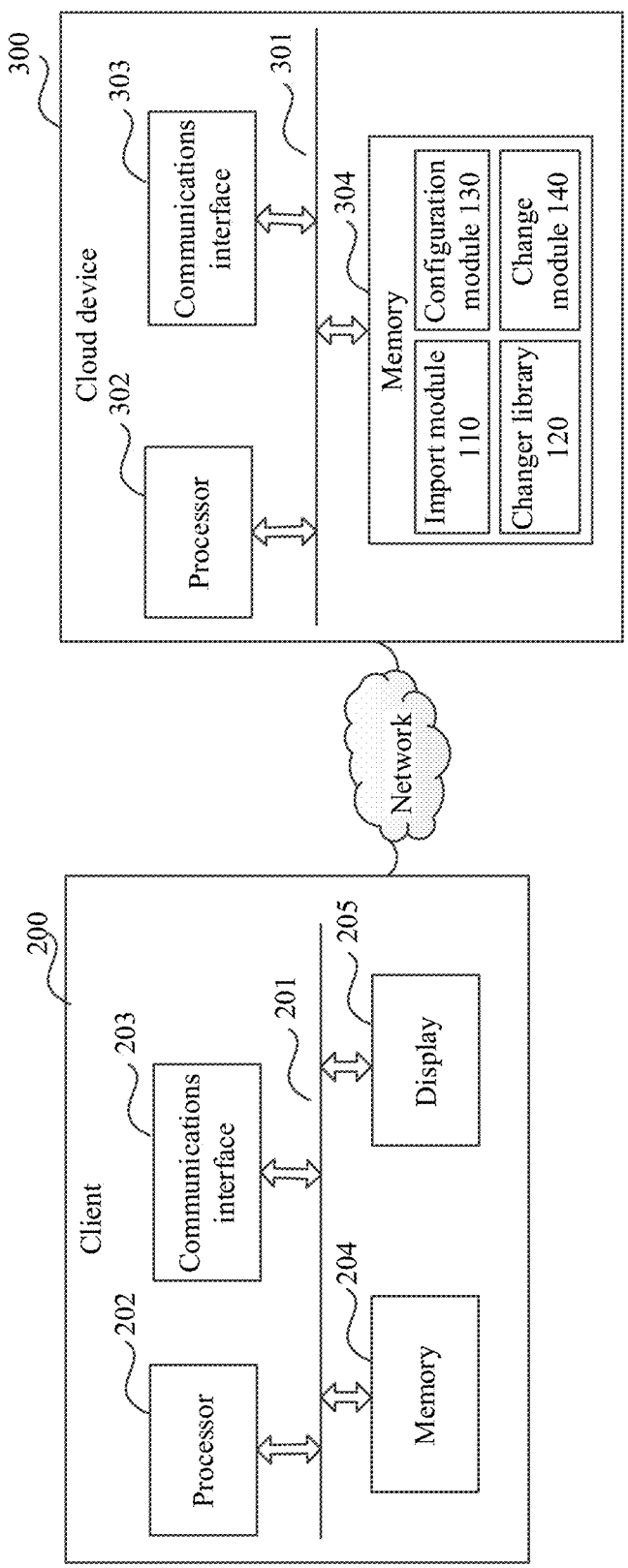
FIG. 2C is a diagram of a system architecture according to this application.

FIG. 2C shows a system architecture according to an embodiment of this application. The system architecture includes a client 200 and a cloud device 300 on which a change apparatus is deployed. The client 200 is connected to the cloud device 300 by using a network. The cloud device 300 is located in a cloud environment, and may be a server or a virtual machine deployed in a cloud data center. FIG. 2C shows only an example in which the change apparatus is deployed on one cloud device 300. In a possible implementation, the change apparatus may be deployed on a plurality of cloud devices 300 in a distributed manner.

As shown in FIG. 2C, the client 200 includes a bus 201, a processor 202, a communications interface 203, and a memory 204. Optionally, the client 200 further includes a display 205. The processor 202, the memory 204, and the communications interface 203 communicate with each other through the bus 201. For types of the processor 202 and the memory 204, refer to related descriptions of the processor 102 and the memory 104. Details are not described herein again. The memory 204 stores executable code, and the processor 202 may read the executable code in the memory 204 to implement a function. The processor 202 may further trigger the display 205 to display information to a user, such as information included in interfaces shown in FIG. 4, FIG. 9, and FIG. 10 in the embodiments of this application. The processor 202 may further communicate with the cloud device through the communications interface 203. For example, the processor 202 may prompt, by using the display, the user to input to-be-changed software code and change configuration information, and determine the to-be-changed software code and the change configuration information when triggered by the user; and return the to-be-changed software code and the change configuration information to the cloud device 300 by using the communications interface 203.

As shown in FIG. 2C, the cloud device 300 includes a bus 301, a processor 302, a communications interface 303, and a memory 304. The processor 302, the memory 304, and the communications interface 303 communicate with each other through the bus 301. For types of the processor 302 and the memory 304, refer to related descriptions of the processor 102 and the memory 104. Details are not described herein again. The memory 304 stores executable code. The processor 302 may read the executable code in the memory 304 to implement a function, and may further communicate with the client 200 through the communications interface 303. In this embodiment of this application, refer to FIG. 2B, processors 302 of a plurality of cloud devices 300 may cooperate to implement functions of the change apparatus 100. In this case, The memory 304 stores one or more of the import module 110, the changer library 120, the configuration module 130, and the change module 140 of the change apparatus 100.

It should be noted that, when the memory 304 stores the change module 140, the change module 140 further includes a cache space. The cache space is located in the memory 304, and the cache space may be configured to store an analysis result obtained by the first called changer by analyzing the to-be-changed software code, and delayed change content of each called changer.

After receiving the to-be-changed software code and the change configuration information from the client 200 by using the communications interface 303, the processor 302 may call the module stored in the memory 304 to implement the code change method provided in the embodiments of this application, and generate changed software code. The processor 302 may send the changed software code to the client 200 by using the communications interface 303. Optionally, the processor 302 may further determine direct change content and delayed change content of all called changers, and send the direct change content and the delayed change content of all the called changers to the client 200 by using the communications interface 303.

After the processor 202 in the client 200 receives, by using the communications interface 203, the changed software code and the direct change content and the delayed change content of all the called changers, the processor 202 may trigger the display 205 to display the changed software code and the direct change content and the delayed change content of all the called changers to the user.

Figure 3B:
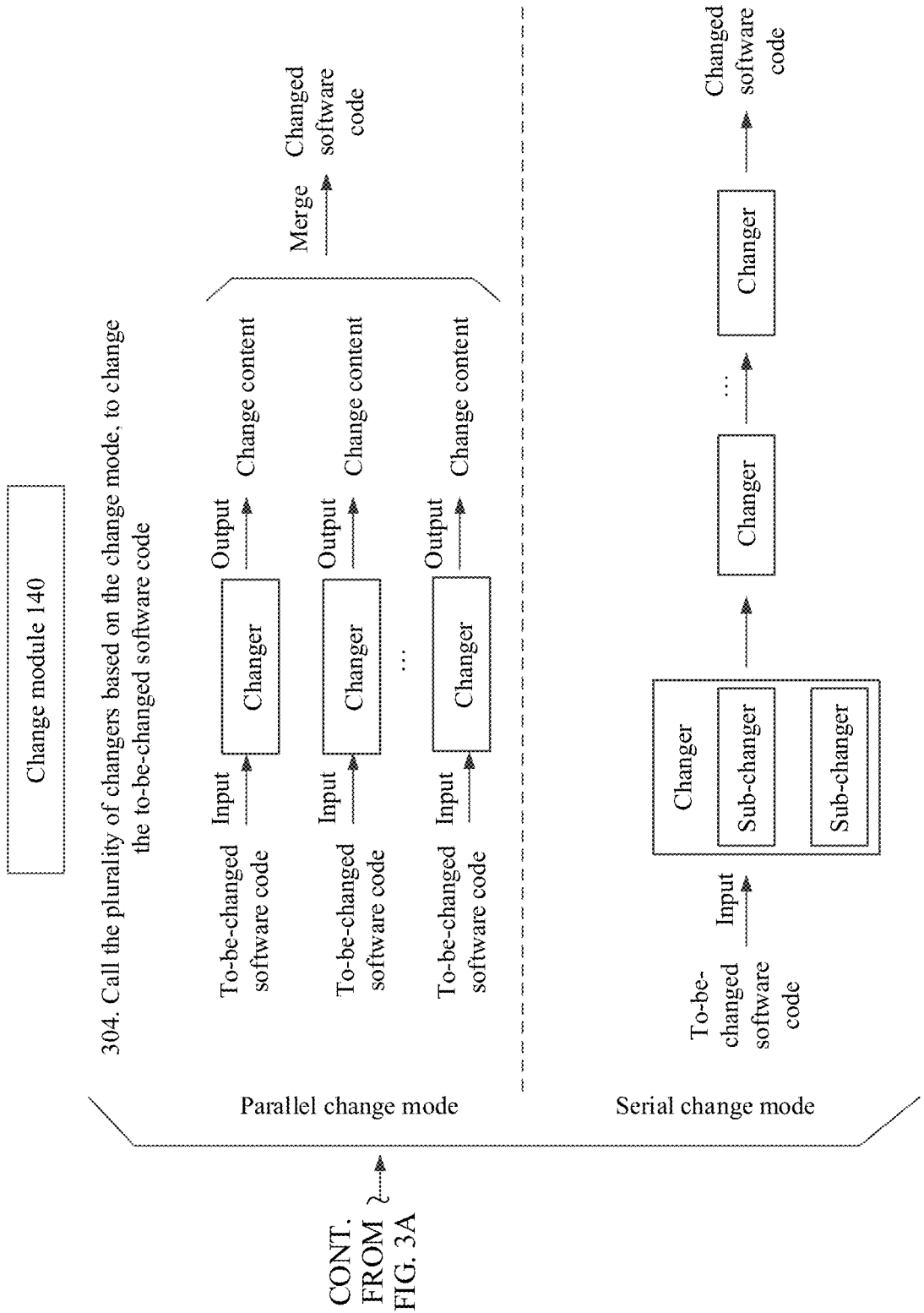

A software code change method that supports a plurality of types of changes and that is provided in an embodiment of this application is described below with reference to FIG. 3A and FIG. 3B. Refer to FIG. 3A and FIG. 3B, the method includes the following steps.

Step 301: The import module 110 determines to-be-changed software code and change configuration information from a user on the to-be-changed software code.

The change configuration information includes multiple to-be-changed code elements, multiple change manners (for example, modify or delete) of the multiple to-be-changed code elements, and multiple changed code elements corresponding to the multiple to-be-changed code elements.

It should be noted that, for a change that multiple to-be-changed code elements need to be deleted, multiple changed code elements corresponding to the multiple to-be-changed code elements is a null value.

A quantity of to-be-changed code elements is not limited in this embodiment of this application, and may be one or more. The change configuration information may be configured by the user or may be fixed. This is not limited in this embodiment of this application.

It should be noted that, in this embodiment of this application, an example in which the change configuration information includes a plurality of types of to-be-changed code elements is used for description. When the change configuration information includes a type of to-be-changed code elements, the configuration module 130 only needs to select, from the changer library 120, a changer that can correspondingly change the type of to-be-changed code elements, and the change module 140 only needs to call the changer to change the to-be-changed software code.

There are many manners in which the import module 110 determines the to-be-changed software code or the change configuration information. For example, the user may trigger a terminal device to send, to the import module 110, a request message that carries the to-be-changed software code and the change configuration information. The request message is used to request the change apparatus 100 to change the to-be-changed software code.

For another example, the user may import the to-be-changed software code to the import module 110, and set the change configuration information when prompted by the import module 110.

The to-be-changed software code may be code of entire software (all files in a plurality of directories), or may be code (all files in a directory) used to implement a function in the code of the entire software, or may be a code file in the code of the entire software.

Figure 4:
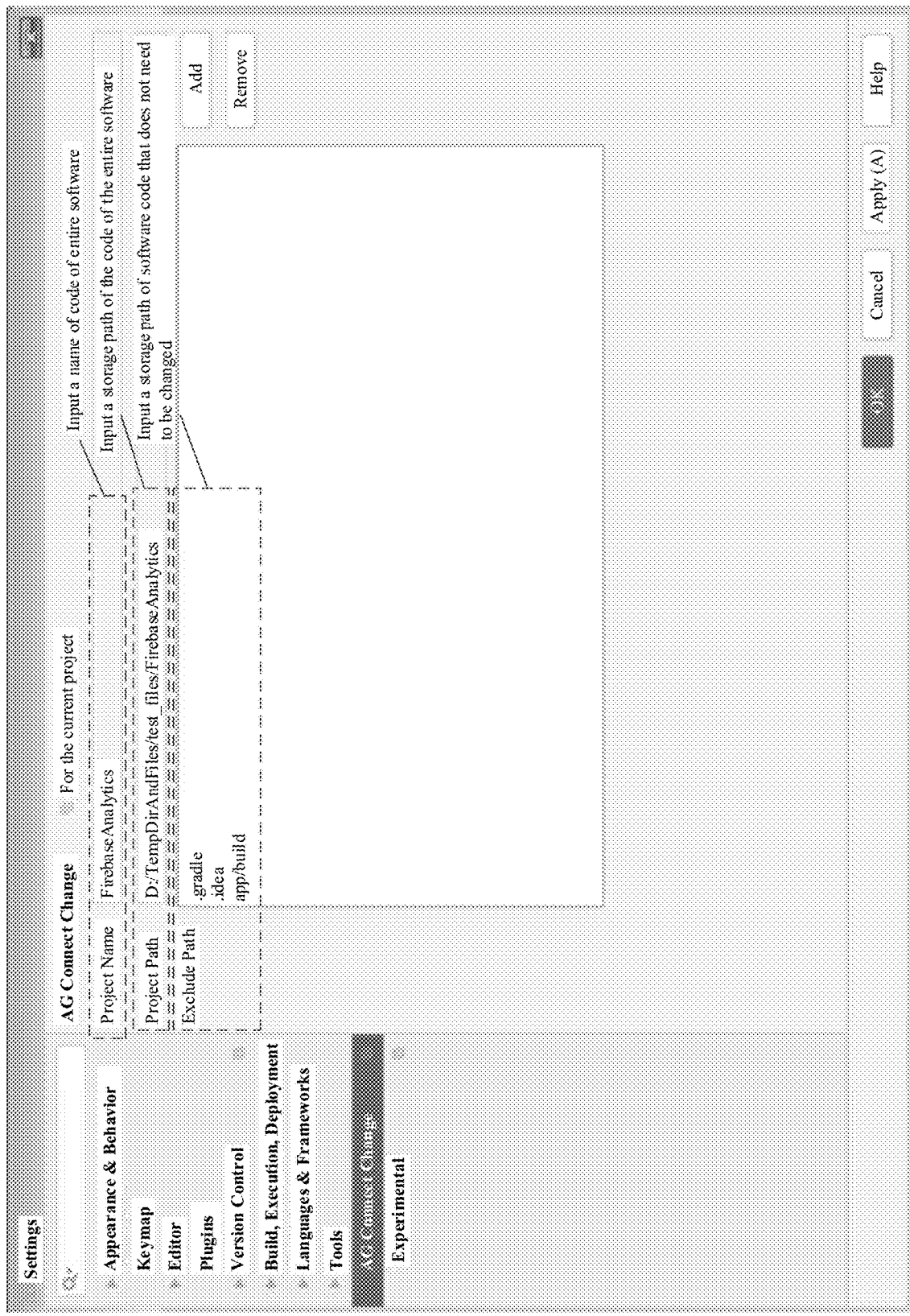
FIG. 4 is a diagram of a display interface for prompting a user to input to-be-changed software code according to this application.

In a possible implementation, the user may import the code files of the entire software into the import module 110. The user may select software code that does not need to be changed from the code files of the entire software when prompted by the import module 110, and remaining software code is used as the to-be-changed software code. As shown in FIG. 4, the user inputs a storage path of the software code that does not need to be changed, so that the import module 110 may determine the to-be-changed code from a part of code in the code files of the entire software.

In a possible implementation, the change configuration information may further include other information, and the other information includes one or both of the following: an identifier (ID) of a changer that needs to be called, and a change mode (such as a serial change mode, a parallel change mode, or a partial serial or partial parallel mode) of the to-be-changed software code.

Optionally, when the change mode of the to-be-changed software code is the serial change mode or the partial serial or partial parallel mode, the change configuration information may further include a calling sequence of the changers and attributes of each changer.

In this embodiment of this application, when determining that the to-be-changed software code needs to be changed, the user may autonomously select a changer that needs to be called when the to-be-changed software code is changed. A quantity of changers that need to be called and that are selected by the user is not limited in this embodiment of this application. The changers selected by the user may change only some types of to-be-changed code elements in the change configuration information. A changer required to change another to-be-changed code element in the change configuration information may be selected by the configuration module 130. For a selection manner, refer to step 302.

The user may also select a change mode of the to-be-changed software code. For example, when the user determines that changes on a plurality of types of to-be-changed code elements in the to-be-changed software code do not conflict, the user may select the parallel change mode. When the user determines that changes on a plurality of types of to-be-changed software elements in the to-be-changed software code conflict, the user may select the serial change mode.

When the user selects the serial change mode or the partial serial or partial parallel mode, the user may further set a calling sequence and attributes of each changer for a plurality of selected changers.

In this embodiment of this application, attributes may be set for each changer, and options of the attributes are a merge change attribute, an ignore change attribute, and an overwrite change attribute, respectively.

The merge change attribute is used to indicate whether to merge changes on a line that are performed by the changer and a changer called prior to the changer. One or more same lines of the to-be-changed software code that are changed by the two changers are briefly referred to as lines. The merge change attribute of the changer may be set to true or false. When the merge change attribute is true, it indicates to merge the changes on the line of the to-be-changed software code that are performed by the changer and the changer called prior to the changer. When the merge change attribute is false, it indicates not to merge the changes on the line that are performed by the changer and the changer called prior to the changer. In this case, the overwrite change attribute needs to be viewed.

The ignore change attribute is used to describe whether to ignore a change performed by the changer on another line of the to-be-changed software code. The another line is a line other than the line in the to-be-changed software code. The ignore change attribute of the changer may be set to true or false. When the ignore change attribute is true, it indicates to ignore the change performed by the changer on the another line. When the ignore change attribute is false, it indicates not to ignore the change performed by the changer on the another line.

The overwrite change attribute is used to describe whether to overwrite the change performed on the line of the to-be-changed software code by the changer called prior to the changer. The overwrite change attribute of the changer may be set to true or false. When the overwrite change attribute is true, it indicates to overwrite the change performed on the line by the changer called prior to the changer, that is, the change performed on the line by the changer called prior to the changer is invalid, and only the change performed by the changer on the line is retained. When the overwrite change attribute is false, it indicates not to overwrite the change performed on the line by the changer called prior to the changer. In this case, the merge change attribute needs to be viewed.

When the user sets the attributes of each changer, conflict that may be generated when a plurality of changers change one or more same lines of the to-be-changed software code may be avoided in advance, so that when the change module 140 calls the changers subsequently, each changer may perform a change relatively quickly.

Step 302: The configuration module 130 selects changers from the changer library 120 based on the change configuration information.

If the change configuration information includes the multiple to-be-changed code elements, the multiple change manners (for example, modify or delete) of the multiple to-be-changed code elements, and the multiple changed code element corresponding to the multiple to-be-changed code element, because different changers are configured to change different type of code elements, the configuration module 130 may select, from the changer library 120 based on the type of to-be-changed code elements, a changer that can change the type of to-be-changed code elements to the corresponding changed code element. A quantity of changers selected by the configuration module 130 is not limited in this embodiment of this application. The quantity of changers is related to the change configuration information.

If the change configuration information further includes the ID of the changer that needs to be called, the configuration module 130 may select, from the changer library 120 based on the ID of the changer, the changer that needs to be called. If the changer corresponding to the ID, included in the change configuration information, of the changer that needs to be called can change only some types of to-be-changed code elements, the configuration module 130 further needs to select, from the changer library 120, a changer that can change a remaining type of to-be-changed code elements to corresponding changed code elements. A quantity of changers selected by the configuration module 130 is not limited in this embodiment of this application. The quantity of changers is related to a quantity of remaining types of to-be-changed code elements in the change configuration information.

Step 303: The configuration module 130 determines, based on the change configuration information, a change mode of the to-be-changed software code, for example, the serial change mode, the parallel change mode, or the partial serial or partial parallel mode.

If the change configuration information includes the change mode of the to-be-changed software code, the configuration module 130 may directly determine the change mode of the to-be-changed software code based on the change configuration information.

If the change configuration information does not include a change mode of the to-be-changed software code, the configuration module 130 may determine the change mode of the to-be-changed software code based on the selected changers.

After selecting a plurality of changers, the configuration module 130 determines whether there are two conflicting changers in the plurality of selected changers. If there are not two conflicting changers, the configuration module 130 may use the parallel change mode, or otherwise, the serial change mode or the partial serial or partial parallel mode (where conflicting changers are in the serial mode, and changers that do not conflict are in the parallel mode) is used.

When the change mode of the to-be-changed software code is the serial change mode or the partial serial or partial parallel mode, the configuration module 130 may further set a calling sequence of the changers and attributes of each changer.

If the change configuration information includes the calling sequence of the changer and the attributes of each changer, the configuration module 130 may directly set the calling sequence of the changers and the attributes of each changer based on the change configuration information.

If the change configuration information does not include the calling sequence of the changers or the attributes of each changer, the configuration module 130 may first set the calling sequence of the plurality of changers, and then configure the attributes of each changer based on the calling sequence.

A manner of setting the calling sequence is not limited in this embodiment of this application. For example, the configuration module 130 may set priorities for the plurality of changers in the changer library 120, and a changer with a higher priority needs to be called first, and a changer with a lower priority needs to be called later. The configuration module 130 may determine the calling sequence based on the priorities of the plurality of changers.

For another example, the configuration module 130 prestores a plurality of calling schemes, and each calling scheme may include all changers, or may include some changers. The configuration module 130 may perform matching between the plurality of changers and the plurality of calling schemes to obtain a target calling scheme. The target calling scheme includes the plurality of changers, and the target calling scheme may further include another changer in addition to the plurality of changers.

The configuration module 130 may determine the calling sequence of the plurality of changers based on a sequence of the plurality of changers in the target calling scheme.

For example, the changer library 120 prestores five different changers, which are a changer A, a changer B, a changer C, a changer D, and a changer E, respectively, and the configuration module 130 preconfigures three calling schemes. A scheme 1 is A->B->D->E->C. A scheme 2 is A->B->D->E. A scheme 3 is A->D->E->C.

The changers selected by the configuration module 130 are the changer A, the changer B, and the changer C. Only the scheme 1 includes the changer A, the changer B, and the changer C, and therefore, the scheme 1 is the target calling scheme. Because the changer D and the changer E are not selected, the scheme 1 may be converted to A->B->C, and the calling sequence configured by the configuration module 130 is A->B->C.

Certainly, the foregoing manner of determining the calling sequence is merely an example. A manner in which the configuration module 130 determines the calling sequence is not limited in this embodiment of this application. In a possible implementation, the configuration module 130 may alternatively determine the calling sequence of the plurality of changers in a random manner.

After determining the calling sequence of the plurality of changers, the configuration module 130 may set, based on the calling sequence (and the change configuration information), attributes of a changer other than the first called changer.

The configuration module 130 may prestore attribute configuration schemes of changers. An attribute configuration scheme of a changer records a calling sequence between the changer and another changer (the another changer is a changer that may conflict with the changer), and attributes of the changer in the sequence. The configuration module 130 sets the attributes of the plurality of changers based on the calling sequence of the changers and attribute configuration schemes of the changers.

For example, for the changer A, the changer B, and the changer C, an attribute configuration scheme of the changer B is as follows: When the changer B is called prior to the changer A, three attributes of the changer B are all set to false. If the changer A is called prior to the changer B, a merge change attribute of the changer B is true, and an ignore change attribute and an overwrite change attribute are false. An attribute configuration scheme of the changer C is as follows: When the changer C is called prior to the changer B, three attributes of the changer C are all set to false. If the changer B is called prior to the changer C, a merge change attribute and an ignore change attribute of the changer C are false, and an overwrite change attribute of the changer C is true.

If the calling sequence of the plurality of changers that is determined by the configuration module 130 is A->B->C, the merge change attribute of the changer B is true, and the ignore change attribute and the overwrite change attribute of the changer B are false; and the merge change attribute and the ignore change attribute of the changer C are false, and the overwrite change attribute of the changer C is true. Because the changer A is the first called changer, no changer is called prior to the first called changer, so that the configuration module 130 may not set attributes of the changer A.

Step 304: The change module 140 calls the plurality of changers based on the change mode of the to-be-changed software code, to change the to-be-changed software code.

The following separately describes manners in which the change module 140 calls the plurality of changers in the parallel change mode and the serial change mode to change the to-be-changed software code.

The partial serial or partial parallel mode is essentially a combination of the parallel change mode and the serial change mode. For a manner in which the change module 140 calls the plurality of changers in the partial serial or partial parallel mode to change the to-be-changed software code, refer to the following descriptions in Manner 1 and Manner 2. For a plurality of parallel changers in the partial serial or partial parallel mode, the change module 140 calls the plurality of changers in Manner 1 to change software code input into the plurality of changers. For a plurality of serial changers (or changer combinations) in the partial serial or partial parallel mode, the change module 140 calls the plurality of changers (or changer combinations) in Manner 2 to change software code input into the plurality of changers (or changer combinations). For details, refer to the following descriptions. Details are not described herein.

Manner 1: based on the parallel change Mode, the plurality of changers are simultaneously called to change the to-be-changed software code.

In the parallel change mode, the change module 140 may call the plurality of changers to simultaneously change the to-be-changed software code. After a change of each of the plurality of changers ends, changed software code generated by all the changer may be merged. Merged software code is final changed software code.

For example, the change module 140 may determine change content of each changer, for example, determine one or more lines of code that are changed when each changer changes the to-be-changed software code, and replace, with the change content of each changer, software code that is in the to-be-changed software code and that is at a position corresponding to the change content of each changer, to obtain the final changed software code.

Manner 2: Based on the serial change mode, the plurality of changers are sequentially called to change the to-be-changed software code.

When a plurality of different changers change the to-be-changed software code in the serial mode, change content generated by the different changers needs to be merged in a relatively convenient manner, but in an existing software code change manner, the change content generated by the different changers cannot be merged.

For example, when a change of a change type 1 is performed on software code, a formal parameter of a function P is changed, and all formal parameters called by the function P in the to-be-changed software code are changed, to generate changed software code 1. When a change of a change type 2 is performed on software code, the function P is changed, and the function P in the to-be-changed software code is changed to a function Q, to generate changed software code 2. Because the function P does not exist in the changed software code 2, the changed software code 1 and the changed software code 2 cannot be simply merged. In other words, when changes of different change types are performed on software code, generated change content easily conflict, and cannot be simply merged. It should be understood that the foregoing example is only a relatively simplified case. When software code is actually changed, change content generated by changes of different change types on the software code conflicts more obviously, and is more difficult to merge.

It can be learned from the above that, to support changes of a plurality of change types, conflict between changes of different change types on software code needs to be resolved, and change content generated by the changes of the different change types on the software code needs to be more efficiently and conveniently merged.

In this embodiment of this application, when calling any changer to change software code input into the changer, the change module 140 determines whether the changer includes direct change content or delayed change content. If the changer includes direct change content and delayed change content, the direct change content of the changer is directly applied to the to-be-changed software code, the delayed change content of the changer is retained, and after calling of all the changers is completed, all delayed change content of the plurality of called changers is applied to software code output by the last changer, to obtain the changed software code. When each changer is called, direct change content is distinguished from delayed change content that may have change conflict in change content of each changer, and all the delayed change content generated by the plurality of changers is applied to the to-be-changed software code at the end, so that conflict caused by changes directly performed by different changers in a calling process can be effectively avoided.

Figure 5:
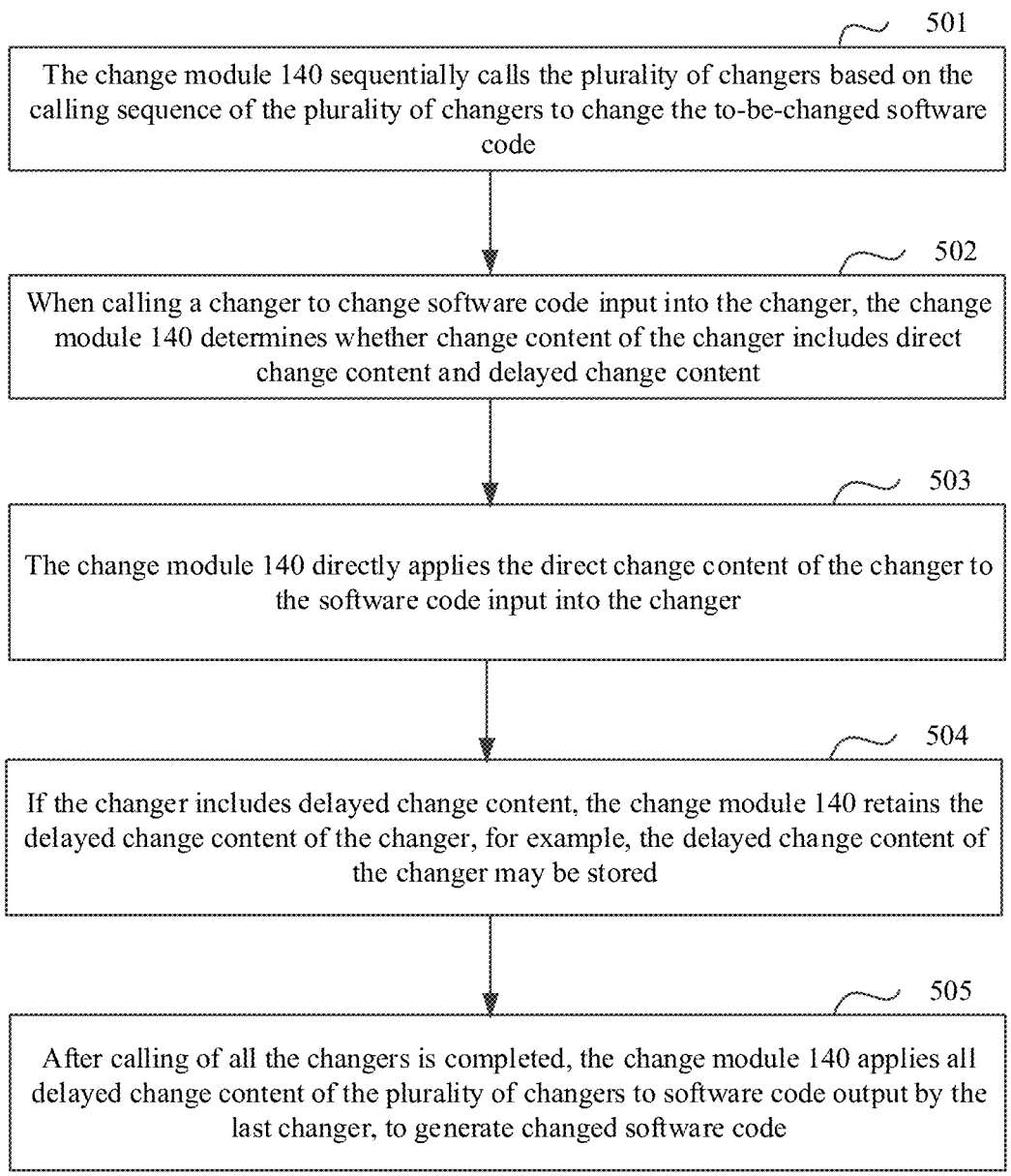
FIG. 5 is a diagram of a method in which a change module 140 changes to-be-changed software code in a serial change mode according to this application.

FIG. 5 is a diagram of a method in which the change module 140 changes the to-be-changed software code in the serial change mode. The method includes the following steps.

Step 501: The change module 140 sequentially calls the plurality of changers based on the calling sequence of the plurality of changers to change the to-be-changed software code. An input of each changer is an output of a previous changer, and the to-be-changed software code is an input of the first called changer.

Step 502: When calling a changer to change software code input into the changer, the change module 140 determines whether change content of the changer includes direct change content and delayed change content.

Step 503: The change module 140 directly applies the direct change content of the changer to the software code input into the changer.

Step 504: If the changer includes delayed change content, the change module 140 retains the delayed change content of the changer, for example, the delayed change content of the changer may be stored.

Step 505: After calling of all the changers is completed, the change module 140 applies all delayed change content of the plurality of changers to software code output by the last changer, to generate changed software code.

Figure 6A:
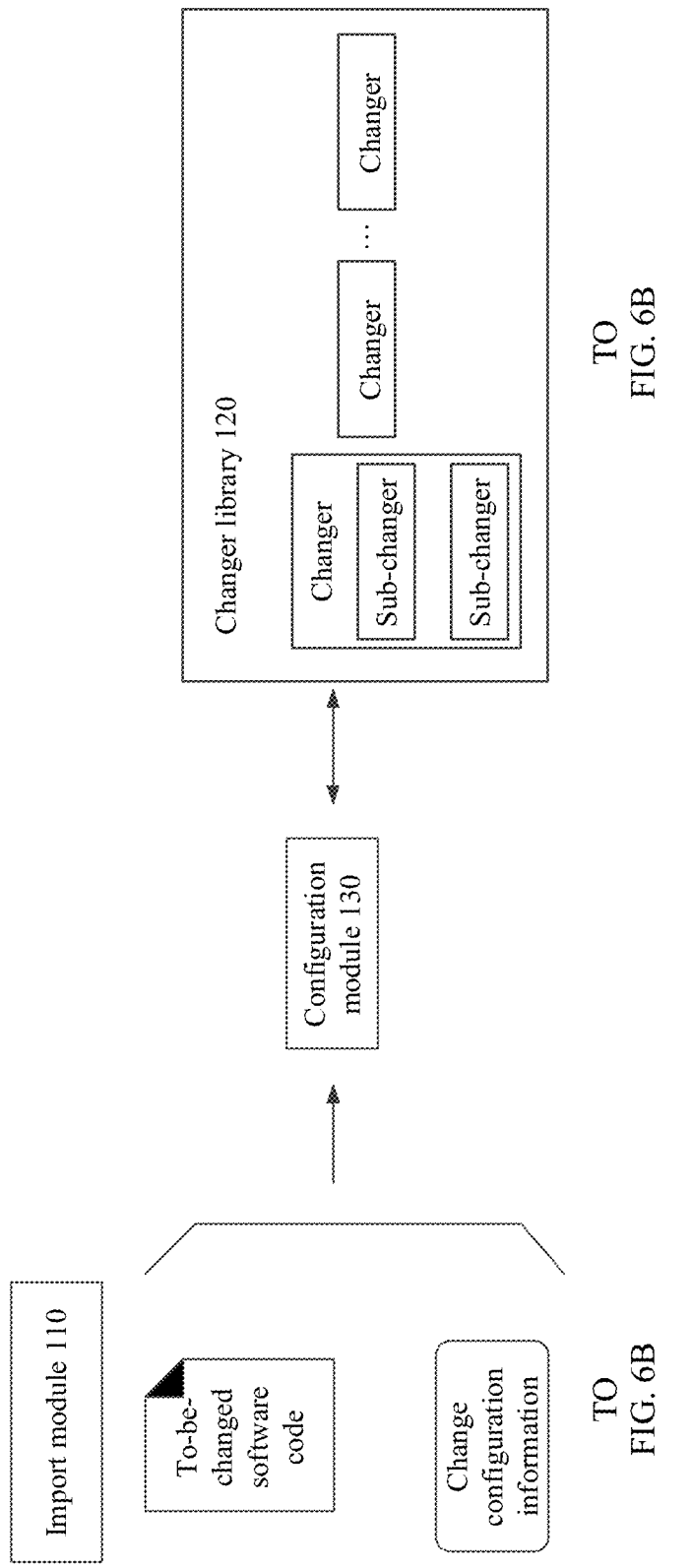
FIG. 6A and FIG. 6B are a flowchart in which the change module 140 changes the to-be-changed software code in the serial change mode according to this application.
Figure 6B:
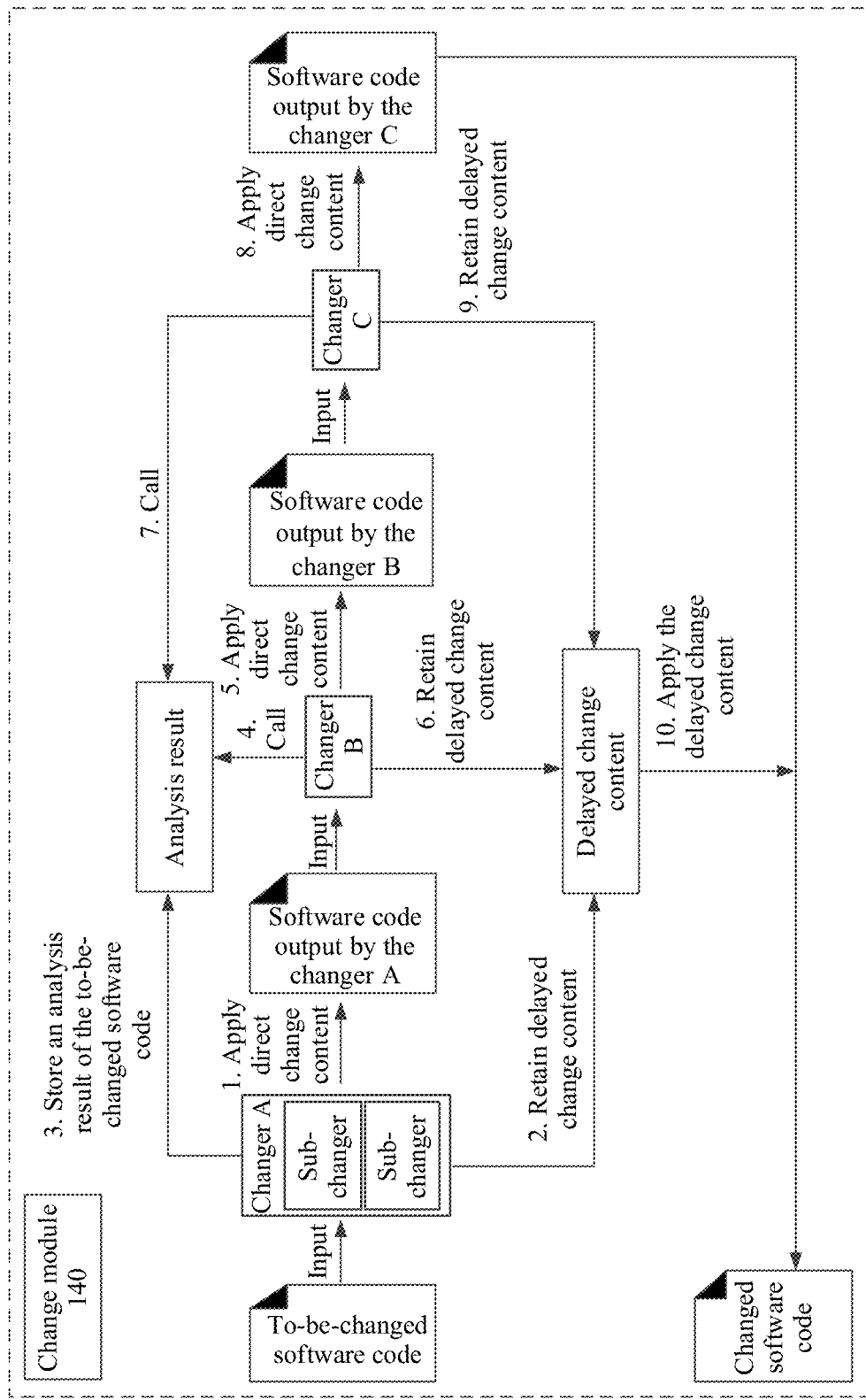

To more intuitively present the method in which the change module 140 changes the to-be-changed software code in the serial change mode, refer to FIG. 6A and FIG. 6B. FIG. 6A and FIG. 6B are a flowchart in which the change module 140 changes the to-be-changed software code in the serial change mode. The change module 140 sequentially calls the changer A, the changer B, and the changer C based on the calling sequence of A->B->C.

The change module 140 inputs the to-be-changed software code into the changer A, and when calling the changer A, determines whether change content of the changer A includes direct change content and delayed change content. If the change content includes direct change content, the change module 140 applies the direct change content to the to-be-changed software code (1), and changed software code is software code output by the changer A. If the change content includes delayed change content, the change module 140 retains the delayed change content (2). When the changer A changes the to-be-changed software code, an analysis result of the to-be-changed software code may be further stored (3). The analysis result includes positions of all the code elements in the to-be-changed software code (for a description of the analysis result, refer to the following description, and details are not described herein).

Subsequently, the change module 140 inputs, into the changer B, the software code output by the changer A, and when calling the changer B, the change module 140 determines whether change content of the changer B includes direct change content and delayed change content. If the change content includes direct change content, the change module 140 applies the direct change content to the software code input into the changer B (5), and changed software code is software code output by the changer B. If the change content includes delayed change content, the change module 140 retains the delayed change content (6). When the changer B changes the software code input into the changer B, the analysis result stored by the changer A may be further called (4), and a change position of the software code input into the changer B is determined based on the analysis result.

Subsequently, the change module 140 inputs, into the changer C, the software code output by the changer B, and when calling the changer C, the change module 140 determines whether change content of the changer C includes direct change content and delayed change content. If the change content includes direct change content, the change module 140 applies the direct change content to the software code input into the changer C (8), and changed software code is software code output by the changer C. If the change content includes delayed change content, the change module 140 retains the delayed change content (9). When the changer C changes the software code input into the changer C, the analysis result stored in the changer A may be further called (7), and a change position of the software code input into the changer C is determined based on the analysis result.

Finally, the change module 140 applies all delayed change content of the plurality of changers to the software code output by the changer C, to generate changed software code.

When performing step 502, when the change module 140 calls any one of the plurality of changers to change software code input into the changer, the change module 140 may determine, based on preset delayed change content (such as inner class change content and class split change content), whether change content of the changer includes delayed change content, and if the change content includes delayed change content, retain the delayed change content. If the change content does not include delayed change content, the change module 140 determines direct change content of the changer.

It should be noted herein that although the delayed change content of the changer is retained from the change content of the changer, there still may be some potential conflict between changers. The potential conflict may result in that only a part of content other than the delayed change content in the change content of the changer can be applied to the software code input into the changer (the part is direct change content), and other direct change content that cannot be applied to the software code input into the changer is deleted.

When determining the direct change content in the change content of the changer, the change module 140 needs to use attributes of the called changer to determine the direct change content of the changer based on some or all attributes of the changer. The following describes a manner in which the change module 140 determines the direct change content of the changer.

Step 1: Each time a changer is called, the change module 140 determines an original change instance set of the changer.

Step 2: The change module 140 generates an intermediate change instance set of the changer based on the original change instance set of the changer and an original change instance set of a changer called prior to the changer.

For a change instance 1 in the original change instance set of the changer, the change instance 1 records a line number 1 of a line that needs to be changed, the change module 140 may search the original change instance set of the changer called prior to the changer for all line number changes before the line number 1. The line number changes include, but are not limited to, line number changes resulting from adding or deleting a line by the changer called prior to the changer.

The change module 140 may calculate, in an accumulation manner, a line change quantity caused by changing the to-be-changed software code by the changer called prior to the changer. For example, if the changer called prior to the changer adds N lines, an accumulated value is a positive number and is N. If the changer called prior to the changer deletes M line numbers, an accumulated value is a negative number and is −M.

The change module 140 subtracts the line change quantity from the line number 1 recorded in the change instance 1 of the changer, to determine a line number 2 that the changer needs to change when based on the to-be-changed software code, and generate a change instance 2 (where a line number is a line number 2, and changed content of the line is the same as changed content of the line of the line number 1 recorded in the change instance 1) that is in the intermediate change instance set of the changer and that corresponds to the change instance 1. In the foregoing manner, all change instances in the intermediate change instance set of the changer may be generated.

Figure 7:
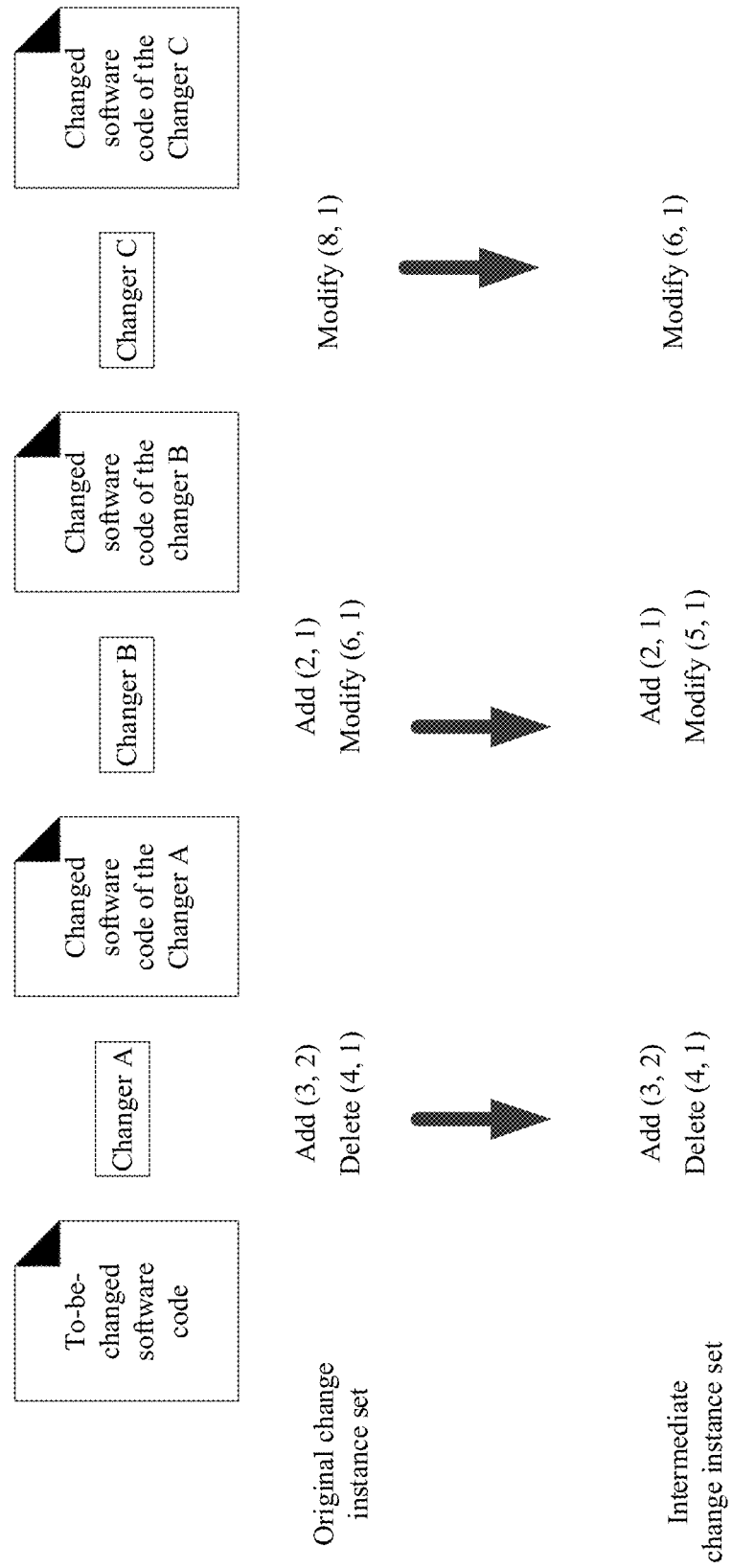
FIG. 7 is a diagram of generating an intermediate change instance set of a changer according to this application.

FIG. 7 shows three serial changers, which are a changer A, a changer B, and a changer C, respectively. A line number of a line that needs to be changed and changed content when each changer changes software code input into the changer are marked below each changer (which may be considered as an original change instance set of each changer), and identified by an operation (a value 1, a value 2). The operation may be classified into add, modify, and delete. The value 1 indicates a line number, and the value 2 indicates a quantity of operated lines. For example, add (3, 2) indicates that two lines of code are inserted at the third line of the software code input into the changer, delete (4, 1) indicates that one line of code is deleted from the fourth line of the software code input into the changer, and modify (6, 1) indicates that one line of code is modified at the sixth line of the software code input into the changer (that is, a quantity of lines does not increase or decrease).

An operation of the changer B is add (2, 1). Because changes are performed on code after the second line when a previous changer (changer A) of the changer B changes the to-be-changed software code, the line number in the operation does not change. Another operation of the changer B is modify (6, 1). It can be learned that when the changer A changes the to-be-changed software code, two lines are inserted and one line is deleted before the sixth line, and a line change quantity is 1. Therefore, for the another operation modify (6, 1) of the changer B, if a change is performed based on the to-be-changed software code, the operation should be modify (5, 1). Similarly, an operation modify (8, 1) of the changer C is changed to modify (6, 1).

Step 3: The change module 140 generates a target change instance set of the changer based on attributes of the changer, the intermediate change instance set of the changer, and an intermediate change instance set of the changer called prior to the changer.

Step 4: After generating the target change instance set of the changer, the change module 140 may change, by using the target change instance set of the changer, software code input into the changer.

After obtaining an intermediate change instance set of a changer, the change module 140 may determine, based on an intermediate change instance set of the changer and an intermediate change instance set of a changer called prior to the changer, whether the changer and the changer called prior to the changer change one or more same lines of the to-be-changed software code. If the changer and the changer called prior to the changer change one or more same lines of the to-be-changed software code, such changes easily cause conflict between the changers, and the conflict needs to be eliminated.

The following describes a manner of eliminating conflict caused when two changers change one or more same lines (for ease of description, the one or more same lines are briefly referred to as lines) of the to-be-changed software code.

The change module 140 may determine, based on a merge change attribute of the changer, whether changes on the line that are performed by the changer and the changer called prior to the changer need to be merged. If the changes need to be merged, a change instance corresponding to the line may be retained in the intermediate change instance set of the changer, and a change instance corresponding to the line may be retained in the original change instance of the changer.

The change module 140 may determine, based on an ignore change attribute of the changer, whether to ignore a change performed by the changer on another line of the to-be-changed software code. If the change needs to be ignored, a change instance corresponding to the another line may be deleted from the intermediate change instance set of the changer, and a change instance corresponding to the another line may be deleted from the original change instance of the changer.

The change module 140 may determine, based on an overwrite change attribute of the changer, whether to overwrite a change performed on the line of the to-be-changed software code by the changer called prior to the changer. If the change needs to be overwritten, the change module 140 may retain a change instance corresponding to the line in the intermediate change instance set of the changer, and may retain a change instance corresponding to the line in the intermediate change instance set of the changer.

The change module 140 updates the original change instance set of the changer (for example, deletes a change instance or retains a change instance) based on the attributes of the changer. An updated original change instance set of the changer is the target change instance set of the changer.

After updating the intermediate change instance set of the changer (for example, deleting a change instance or retaining a change instance) based on the attributes of the changer, the change module 140 may add a change instance in an updated intermediate change instance set of the changer to a total change instance set.

Figure 8:
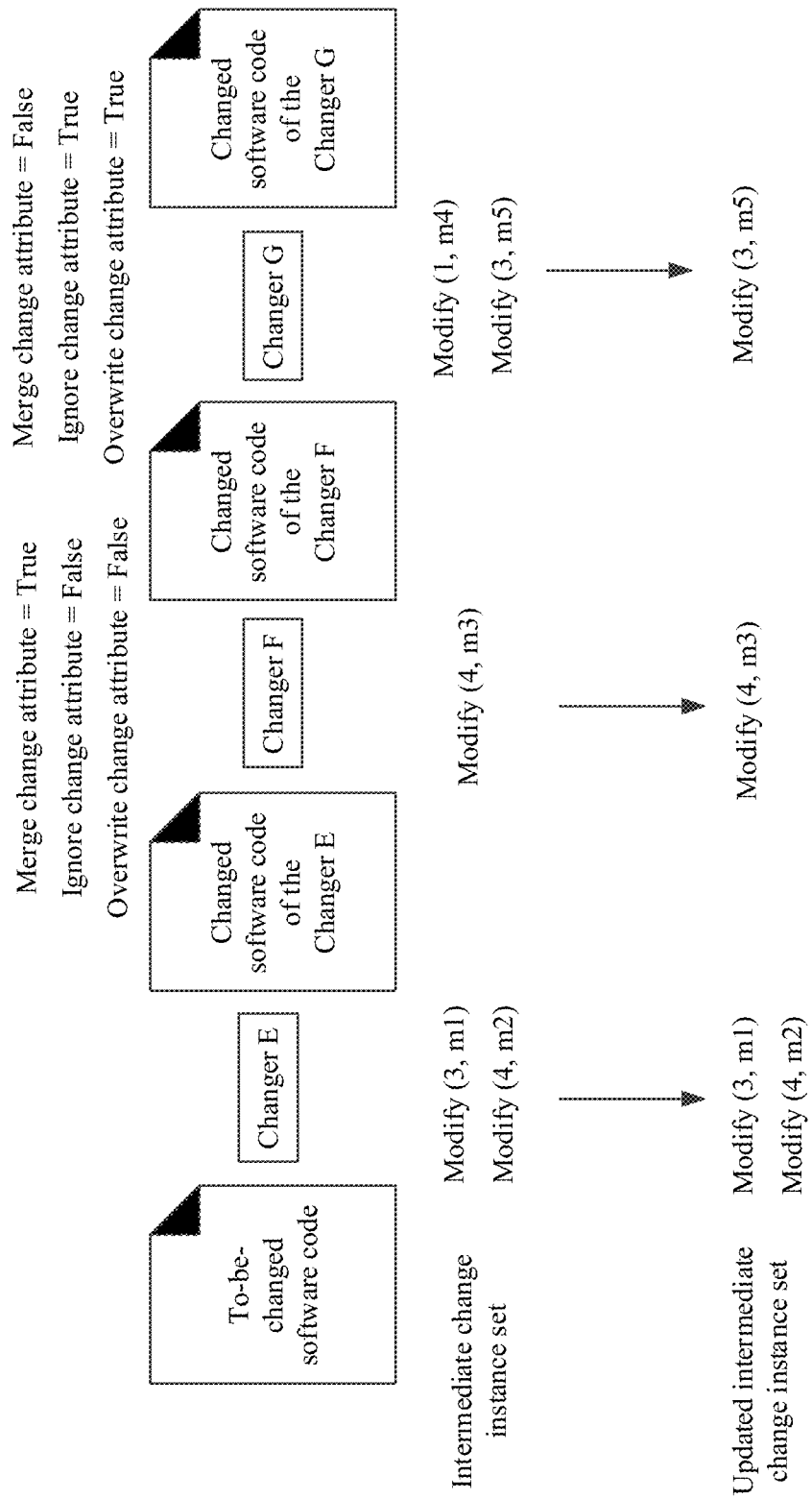
FIG. 8 is a diagram of updating an intermediate change instance set of a changer according to this application.

For example, FIG. 8 shows three serial changers, which are a changer E, a changer F, and a changer G, respectively.

A line number of a line that needs to be changed and changed content when each changer changes the to-be-changed software code are marked below each changer (which may be considered as an intermediate change instance set of each changer). A marking manner is the same as that in the embodiment shown in FIG. 5, and details are not described herein again. In FIG. 8, m1, m2, m3, m4, and m5 are used to indicate modification content, and are only used to distinguish between different modifications. The merge change attribute, the ignore change attribute, and the overwrite change attribute are marked as true or false above the changer F and the changer G. The merge change attribute of the changer B is true, and the ignore change attribute and the overwrite change attribute of the changer B are false. The merge change attribute and the ignore change attribute of the changer C are false, and the overwrite change attribute of the changer C is true.

In FIG. 8, a change instance of the changer F is modify (4, m3), and a change instance of the changer E is modify (4, m2), indicating that the changer E also modifies the fourth line. Because the merge change attribute of the changer F is true, changes of the changer F and the changer E need to be merged, and the change instances of the changer E and the changer F both need to be retained. The change instance modify (4, m3) is retained in an intermediate change instance set of the changer B, and a change instance corresponding to the change instance modify (4, m3) is retained in an original change instance set of the changer F. An updated original change instance set of the changer F is a target change instance set of the changer F.

A change instance of the changer G is modify (1, m4). It can be learned that neither of the changers (changer E and changer F) called prior to the changer G modifies the first line, and the ignore change attribute of the changer G is true. The change instance modify (1, m4) is deleted from an intermediate change instance set of the changer G, and a change instance corresponding to the change instance modify (1, m4) is deleted from an original change instance set of the changer G. Another operation of the changer G is modify (3, m5), the changer E also modifies the third line, and the overwrite change attribute of the changer G is true. The change module 140 retains the change instance modify (3, m5) in the intermediate change instance set of the changer G, and the change module 140 retains, in the original change instance set of the changer G, a change instance corresponding to the change instance modify (3, m5). An updated original change instance set of the changer G is a target instance set of the changer G.

The changer 140 may also add change instances in the updated intermediate change instance set of the changer E, the updated intermediate change instance set of the changer F, and the updated intermediate change instance set of the changer G to a total change instance set. The total change instance set includes modify (4, m2), modify (3, m1), modify (4, m3), and modify (3, m5).

In a possible implementation, the change instance modify (4, m3) of the changer F and the change instance modify (4, m2) of the changer E may be merged, and a merged change instance is modify (4, [m2, m3]). The merged change instance modify (4, [m2, m3]) replaces modify (4, m2) and modify (4, m3) in the total change instance set.

In a possible implementation, when changing input software code, each changer needs to first analyze the input software code, to obtain positions of all code elements in the input software code, then find a position (for example, one or more lines) of multiple to-be-changed code elements, and change the multiple to-be-changed code elements at the position.

Positions (such as lines) at which two changers perform changes when changing the to-be-changed software code may be the same. For example, in a library upgrade scenario, a name of a method is changed, and a formal parameter of the method is also changed, which require a changer that changes the name of the method and a changer that changes an actual parameter of the method. Generally, change positions (lines) of the name of the method and the actual parameter of the method are the same. In this case, the two changers conflict.

When changing the input software code, each changer usually needs to first analyze the input software code, to obtain the positions of all the code elements in the input software code, and may further analyze an inclusion relationship between the code elements, for example, a function/method included in a class, and a variable/field referenced in the function/method. The process of analyzing the input software code by each changer usually requires time. To efficiently change the to-be-changed software code, in this embodiment of this application, the first called changer may store an analysis result of the to-be-changed software code. The analysis result includes positions of all code elements in the to-be-changed software code and an inclusion relationship between the code elements. For example, the analysis result may be stored in the cache space in the change module 140.

When a changer changes input software code, the analysis result stored by the first called changer may be called, and changed software code output by a previous changer is changed based on the analysis result stored by the first changer.

In the foregoing manner, the change module 140 may apply the direct change content of each changer to the software code input into the changer. For the delayed change content of the changer, after direct change content of the last called changer is applied to software code input into the changer, the change module 140 may apply all delayed change content of all the changers to software code output by the last changer.

When all the delayed change content of the plurality of changers is applied to the software code output by the last changer, all the delayed change content of the plurality of changers may also be applied in the serial or parallel mode to the software code output by the last changer. The serial mode is similar to that in the embodiment shown in FIG. 5 or FIG. 6A and FIG. 6B. For example, delayed change content of any changer in all the delayed change content of the plurality of changers is represented by using a delayed change instance set. A change instance in the delayed change instance set is based on the to-be-changed software code, and a manner of determining the change instance in the delayed change instance set is similar to the manner of determining a change instance in an intermediate change instance set of a changer, where it is also necessary to determine a line change quantity caused by changing the to-be-changed software code by the changer called prior to the changer, and perform corresponding accumulation, to determine the change instance in the delayed change instance set. Further, based on the attributes of the plurality of changers, conflicting content in different delayed change content may be avoided, and a change instance may be deleted from the delayed change instance set, to update the delayed change instance set. Subsequently, a change instance in an updated delayed change instance set is updated to the total change instance set.

The change module 140 may display the total change instance set to the user by using the display in the computing device, that is, display lines of all changes performed by the change module 140 on the to-be-changed software code, change manners (delete, modify, add, and the like), and changed content.

The change module 140 provides the following two display manners.

Figure 9:
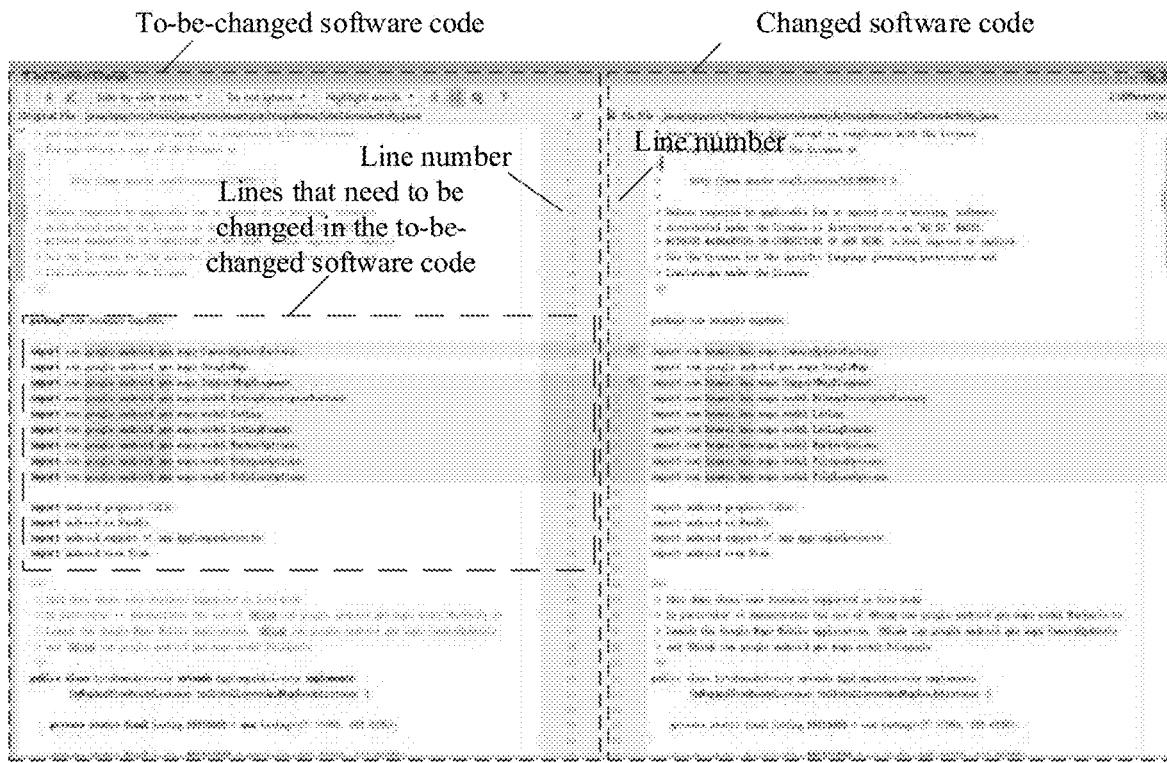
FIG. 9 is a diagram of an interface for displaying changed software code according to this application.

In a first manner, as shown in FIG. 9, the change module 140 may display a contrast interface between the changed software code and the to-be-changed software code. In FIG. 9, the left side is the to-be-changed software code, and the right side is the changed software code. A line number is used for marking in the interface. A line that needs to be changed is marked in bold in the to-be-changed software code.

In the contrast interface, the user may confirm the line that needs to be changed and changed content, and after the change is confirmed as correct, the initial imported to-be-changed software code may be replaced with the changed software code.

Figure 10:
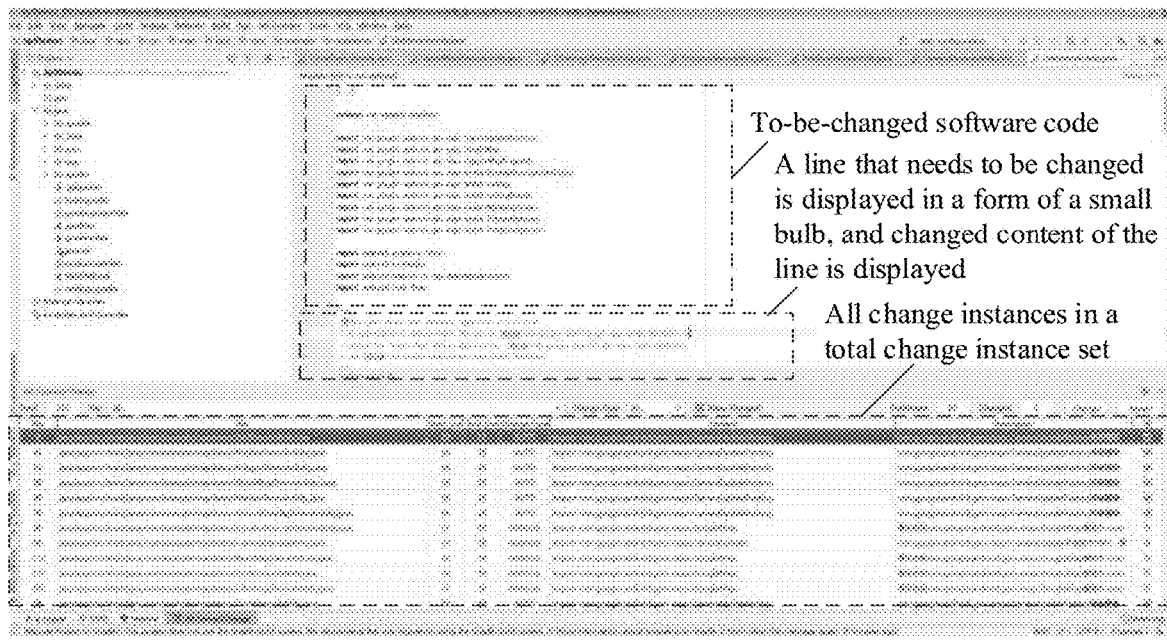
FIG. 10 is a diagram of another interface for displaying changed software code according to this application.

In a second manner, as shown in FIG. 10, the change module 140 may display the to-be-changed software code, and display all change instances in the total change instance set at a lower part of an interface. In a display interface of the to-be-changed software code, a line that needs to be changed is displayed in a form of a small bulb, and changed content of the line is displayed.

The user may confirm changed content of a line, and if the changed content of the line is confirmed as correct, the changed content of the line may be separately applied to the to-be-changed software code.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

The foregoing descriptions are merely implementations of the present disclosure. Any variation or replacement figured out by a person skilled in the art according to the implementations provided in the present disclosure shall fall within the protection scope of the present disclosure.

What is claimed is:

1. A software code change method performed by a change apparatus, comprising:
   obtaining software code and change configuration information from a user in a library upgrade operation or a software code format change operation, wherein the change configuration information comprises multiple to-be-changed code elements in the software code, change manners of the multiple to-be-changed code elements, and multiple changed code elements corresponding to the multiple to-be-changed code elements; and
   sequentially calling the plurality of changers according to the calling sequence to update the software code or change the format of the software code, wherein each changer is configured to change selected to-be-changed code elements in the software code, the selected to-be-changed code elements are of a type corresponding to said each changer, and the changers correspond respectively to different types of code elements, wherein the calling sequence of the plurality of changers is based on the change configuration information, an input of a first called changer of the plurality of changers is the software code, and changed software code of the first called changer is input into a subsequently called changer of the plurality of changers, wherein when there are conflicting changers in the plurality of changers, a change mode for changing the software code is a serial change mode or a partial serial or partial parallel change mode.

2. The method according to claim 1, wherein a changer of the plurality of changers performs direct change content and delayed change content, and the step of sequentially calling the plurality of changers comprises:
   calling the changer to apply the direct change content as input into the changer; and
   calling the changer again to apply the delayed change content after calling a last changer in the calling sequence.

3. The method according to claim 2, wherein the change configuration information further comprises attributes of each changer, and an attribute of said each changer indicates processing performed by each changer on a change on a target line in the software code.

4. The method according to claim 2, wherein before the step of sequentially calling the plurality of changers, the method further comprises:
   determining attributes of each changer based on the calling sequence of the plurality of changers, wherein an attribute of said each changer indicates processing performed by said each changer on a change on a target line in the software code.

5. The method according to claim 2, further comprising:
   determining the direct change content of the changer based on attributes of the changer.

6. The method according to claim 5, wherein the step of determining the direct change content determines the direct change content of the changer based on a first attribute of the changer, wherein the first attribute of the changer indicates retention or deletion of a change on a first target line of the software code, and the first target line is a line on which the changer and a changer called prior to the changer both change the software code.

7. The method according to claim 5, wherein the step of determining the direct change content of the changer comprises:
   determining the direct change content of the changer based on a second attribute of the changer, wherein the second attribute indicates retention or deletion of a change on a second target line of the software code, and the second target line is a line on which the changer changes the software code and the changer called prior to the changer does not change the software code.

8. The method according to claim 1, further comprising:
storing an analysis result of the first called changer on the software code, wherein the analysis result comprises a position of each code element in the software code, wherein the subsequently called changer of the plurality of changers reads the stored analysis result and changes the software code.

9. The method according to claim 1, further comprising:
outputting changed software code generated after the plurality of changers change the software code, and
displaying change positions and change content of changes performed on the software code by the plurality of changers.

10. An apparatus, comprising:
a communication interface;
a memory storing executable instructions; and
a processor configured to execute the executable instructions to:
obtain software code and change configuration information from a user in a library upgrade operation or a software code format change operation, wherein the change configuration information comprises multiple to-be-changed code elements in the software code, multiple change manner of the to-be-changed code elements, and multiple changed code elements corresponding to the multiple to-be-changed code elements; and
sequentially call the plurality of changers based on the calling sequence of the plurality of changers to update the software code or change the format of the software code, wherein each changer is configured to change selected to-be-changed code elements in the software code, the selected to-be-changed code elements are of a type corresponding to said each changer, and the changers correspond respectively to different types of code elements, wherein the calling sequence of the plurality of changers is based on the change configuration information, an input of a first called changer of the plurality of changers is the software code, and changed software code of the first called changer is input into a subsequently called changer of the plurality of changers, wherein when there are conflicting changers in the plurality of changers, a change mode for changing the software code is a serial change mode or a partial serial or partial parallel change mode.

11. The apparatus according to claim 10, wherein a changer performs direct change content and delayed change content, and wherein the processor is configured to sequentially call the plurality of changers by:
calling the changer according to the calling sequence to apply the direct change content to the software code;
calling the changer again to apply the delayed change content after calling a last changer in the calling sequence.

12. The apparatus according to claim 11, wherein the change configuration information further comprises attributes of each changer, and an attribute of said each changer indicates processing performed by each changer on a change on a target line in the software code.

13. The apparatus according to claim 11, wherein before sequentially calling the plurality of changers, the processor is configured to execute the executable instructions to:
determine attributes of each changer based on the calling sequence of the plurality of changers, wherein an attribute of said each changer indicates processing performed by said each changer on a change on a target line in the software code.

14. The apparatus according to claim 11, wherein the processor is configured to further execute the executable instructions to:
determine the direct change content of the changer based on attributes of the changer.

15. The apparatus according to claim 14, wherein the processor is configured to determine the direct change content of the changer based on a first attribute of the changer, wherein the first attribute of the changer indicates retention or deletion of a change on a first target line of the software code, and the first target line is a line on which the changer and a changer called prior to the changer both change the software code.

16. The apparatus according to claim 14, wherein the processor is configured to determine the direct change content of the changer based on a second attribute of the changer, wherein the second attribute of the changer indicates retention or deletion of a change on a second target line of the software code, and the second target line is a line on which the changer changes the software code and the changer called prior to the changer does not change the software code.

17. The apparatus according to claim 10, wherein the processor is configured to further execute the executable instructions to:
store an analysis result of the first called changer on the software code, wherein the analysis result comprises a position of each code element in the software code, wherein a subsequently called changer of the plurality of changers reads the stored analysis result and changes the software code.

18. The apparatus according to claim 10, wherein the processor is configured to further execute the executable instructions to:
output changed software code generated after the plurality of changers change the software code, and
display change positions and change content of changes performed on the software code by the plurality of changers.

* * * * *